(12) United States Patent
Zieve

(10) Patent No.: US 12,275,199 B2
(45) Date of Patent: *Apr. 15, 2025

(54) MULTIPLE HEATING SOURCES FOR INDIVIDUAL TOWS IN COMPOSITES MANUFACTURING

(71) Applicant: Electroimpact, Inc., Mukilteo, WA (US)

(72) Inventor: Michael M. Zieve, Seattle, WA (US)

(73) Assignee: Electroimpact, Inc., Mukilteo, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,933

(22) Filed: Apr. 22, 2021

(65) Prior Publication Data

US 2022/0339891 A1 Oct. 27, 2022

(51) Int. Cl.
*B29C 70/38* (2006.01)
*B29C 70/54* (2006.01)

(52) U.S. Cl.
CPC ............ *B29C 70/384* (2013.01); *B29C 70/54* (2013.01)

(58) Field of Classification Search
CPC ..... B29C 70/38; B29C 70/382; B29C 70/384; B29C 70/386; B29C 70/388; B29C 66/91; B29C 66/914; B29C 66/9141; B29C 66/91411; B29C 66/91421

See application file for complete search history.

(56) References Cited

U.S. PATENT DOCUMENTS

| | | | |
|---|---|---|---|
| 6,096,164 A * | 8/2000 | Benson | B29C 53/8016 |
| | | | 156/425 |
| 6,451,152 B1 * | 9/2002 | Holmes | B29C 66/91221 |
| | | | 156/308.2 |
| 12,023,877 B2 * | 7/2024 | Boyle | B29C 70/384 |
| 2015/0158208 A1 * | 6/2015 | Williams | B29C 70/54 |
| | | | 156/275.5 |
| 2018/0017499 A1 * | 1/2018 | Monchalin | B29C 70/38 |
| 2021/0206123 A1 * | 7/2021 | Boyle | B29C 70/384 |
| 2021/0206124 A1 * | 7/2021 | Boyle | B29C 70/384 |

* cited by examiner

*Primary Examiner* — George R Koch
(74) *Attorney, Agent, or Firm* — Larsen IP PLLC; James C. Larsen

(57) ABSTRACT

An AFP or ATL composites manufacturing head providing one or more fiber element tows under tension to a compaction roller which in operation presses the individual tow(s) onto a substrate to produce a part or tool. Two or more separately controlled heat sources are provided for at least one of the tows and its corresponding substrate to consolidate the tow and substrate.

14 Claims, 34 Drawing Sheets

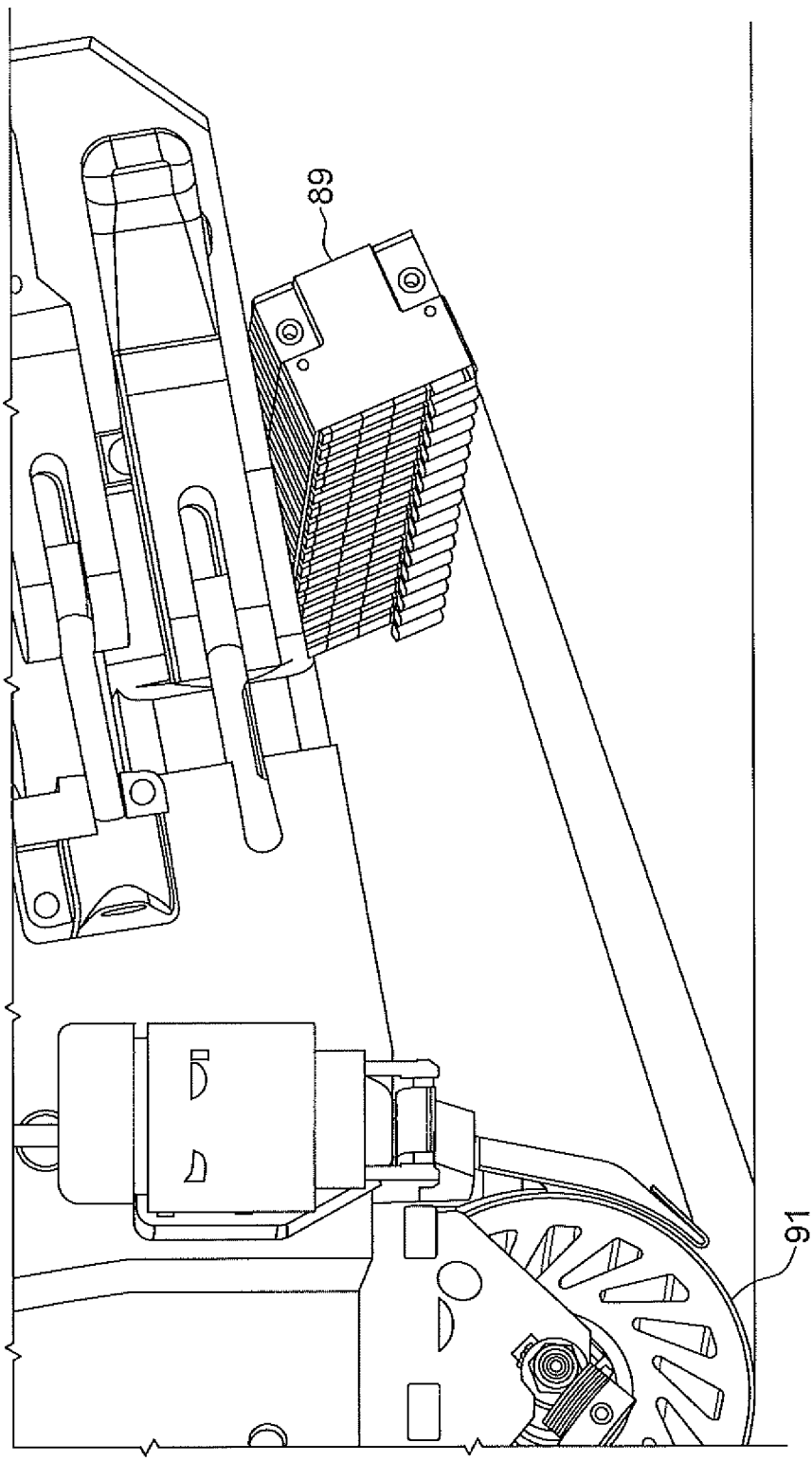

MULTIPLE HEATING SOURCES FOR INDIVIDUAL TOWS IN COMPOSITES MANUFACTURING

TECHNICAL FIELD

This invention relates generally to Automatic Fiber Placement (AFP) machines for laying of composite material to build parts used in the commercial aircraft industry, and more specifically concerns a heating system for the composite material from an AFP head assembly.

BACKGROUND OF THE INVENTION

An AFP machine includes an AFP head which includes a plurality of spool assemblies which use composite tow that is wound onto a bobbin. Each spool feeds a single tow for lamination on a substrate. In operation, multiples spools of material are unwound and the material is placed onto the part in a course. Multiple courses of composite material comprise a ply, as shown in FIG. 1. A part, such as used in the commercial aircraft industry, is built up using multiple plies with various orientations, as shown in FIG. 2. Each ply is considered in sequence to be a substrate as new courses are deposited on them. Heat is applied during the process so that the material deposited by the AFP head, sometimes referred to as an end effector, adheres to the substrate. Typical ply orientations are 0, 45, 90 and 135 degrees. A ply may be applied at any angle, even parallel to the previous ply, but more likely parallel to a ply several courses previous. The tow may also be steered or directed under control in a selected path, e.g. curved or more complex, onto the part or also designed to cover only a small portion of the substrate. A compaction roller is used to compress the course onto the substrate.

Different composite materials are used in AFP machines. One common material for aircraft parts, for instance, is carbon fiber that is pre-impregnated with a thermoset resin. The material is stored in a freezer to prevent the resin from prematurely curing.

Another material is a "dry" carbon fiber which is later infused with resin in a secondary process and then cured. In order to enable the dry fiber material to be deposited and consolidated with an AFP machine, a thin veil of resin, usually a thermoplastic resin, coats the fibers. More heat is required to make a laminate with dry fiber in comparison with thermoset.

Still another material is thermoplastic pre-impregnated fiber. Thermoplastic resin material typically requires more heat to process properly than either dry fiber or thermoset fiber. Since more heat is required to make a laminate with thermoplastic, only the higher power heating solutions will be effective. Other fibers used include boron fiber, glass fiber, Kevlar fiber and lightning strike material.

As described in detail below, the present invention is of great value for thermoset, dry fiber, thermoplastic and other resin systems that require heat for consolidation.

As indicated above, heating is necessary for composite fiber material used in AFP machines to stick to and consolidate with the substrate. One known technique uses infrared bulb heaters. The infrared light heats the substrate ahead of the nip point. The infrared output is not focused so that an area wider than the course being processed is heated. Multiple bulbs are needed to produce the desired heating of a course. When the machine stops, the retained heat in the bulbs can damage the substrate so an air knife is switched on to keep the stored heat from the bulbs off of the part. Pre-heating the bulbs when approaching the start of a course, monitoring the latent energy and other measures are necessary to achieve reliable results.

Another known heating technique uses a pulsed flash lamp. It also is sized for the entire width of the course and does not allow for energy to be dynamically switched on and off to each tow lane.

Still another heating technique is a single laser for the entire course width. It can include a fiber-coupled laser in order to move the mass of the laser source off of the AFP head, with optics to focus the energy necessary for consolidation, but again this technique is for the entire width of a course. Over 1 kw of infrared energy is required. One such source of laser light is made by Laserline. This system includes a large power supply at the base of the machine which transmits infrared light energy down a flexible fiber optic cable. A fiber optic termination and lens system is mounted on the AFP head. The location of the fiber optic termination and lens system is illustrated in FIG. 6A. The output beam is pointed at and in line-of-sight with the nip point. The beam is adjusted to be the exact width of the courses. With a single laser for the entire course, there is no capability of switching the heat supply on and off tow by tow. Only the entire course can be switched on and off. Further, with a single fiber coupled laser and the laser source located off of the head, there is not compatibility with a modular AFP head because there is no automatic means to connect and disconnect the fiber optic cable. The operator of the machine is required to remove the optics manually before the AFP head can be changed out automatically.

A condition known as roller wrap is often a significant limitation on the operation of AFP machines. A roller wrap occurs when substrate material, a tow or a portion of a tow, is inadvertently picked up by the compaction roller and pulled off of the part, wrapping around the compaction roller. Roller wrap has a negative effect on the reliability of AFP machine operation. The end effector and the part require attention in order to recover from a roller wrap condition.

SUMMARY OF THE INVENTION

Accordingly, in one embodiment, the invention comprises an AFP head or heads system in a machine, comprising: an AFP head generating one or more tows under tension; an assembly for receiving the tow or tows and for applying the tow or tows onto a substrate; multiple heat sources, wherein heat from two or more of the multiple heat sources is applied to at least one tow of the tow or tows; and a control unit for controlling the heat sources in coordination with heating the at least one tow as it is being applied. Another embodiment comprises an ATL head or heads system in a machine, comprising: an ATL head generating a single tow under tension; an assembly for receiving the single tow and for applying the tow onto a substrate; and multiple laser heat sources, wherein heat from two or more laser heat sources is applied to the tow and/or its corresponding substrate.

BRIEF DESCRIPTION OF THE DRAWING

FIG. 16 shows sixteen T6 laser heat source modules mounted on an AFP head with line of sight to the nip point.

BEST MODE FOR CARRYING OUT THE INVENTION

Figure 5:
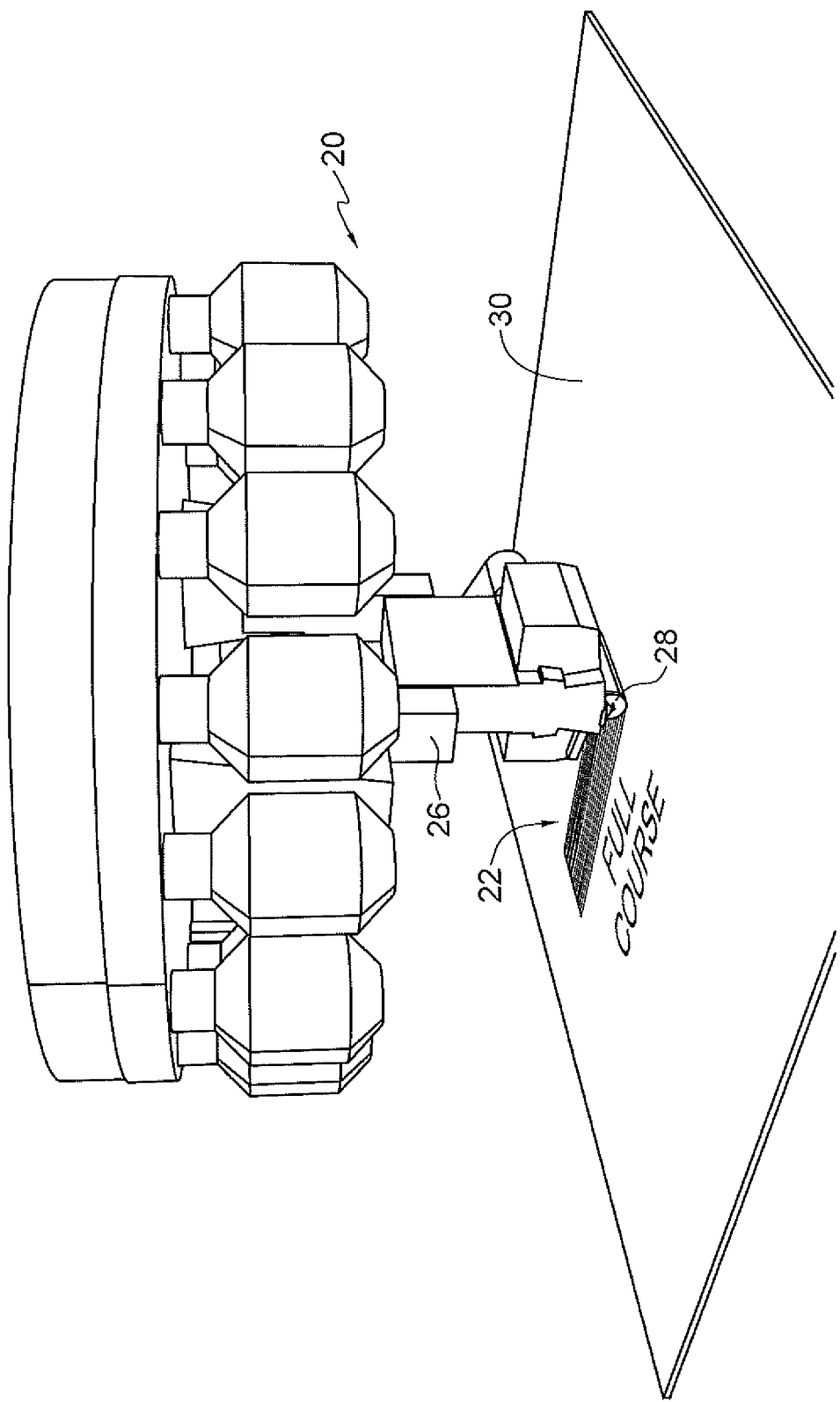
FIG. 5 is a schematic view showing an AFP machine for laying down a fiber full course.
Figure 6:
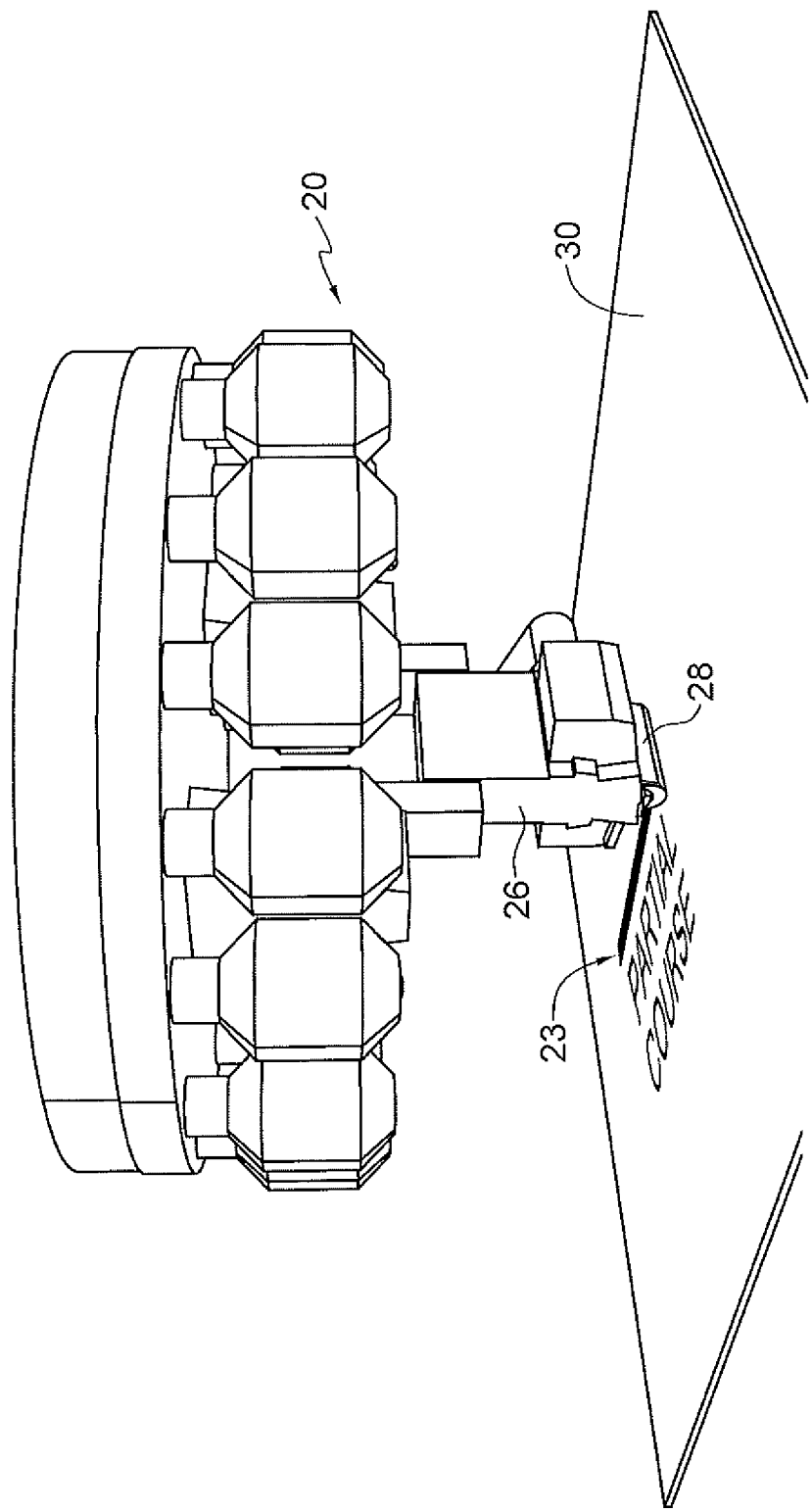
FIG. 6 is a schematic view showing an AFP machine laying down a fiber partial course.
Figure 6A:
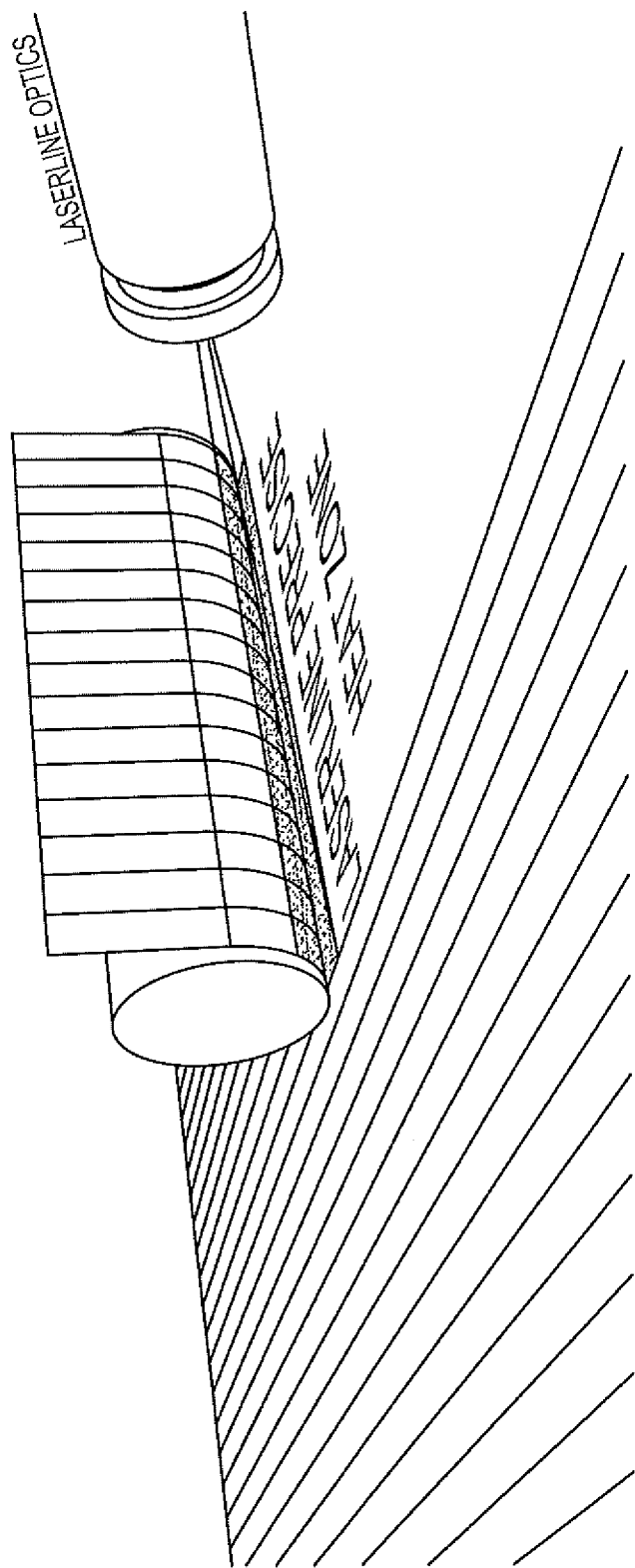
FIG. 6A is a schematic view of a prior art Laserline heating system.

Referring to FIG. 5, an AFP machine 20 is shown producing a line of sixteen tows 22 comprising a full course, or FIG. 6 for a partial course 23. Appropriate tension on the course is produced by normal operation of the AFP head assembly, and is hence not described in detail herein. An example of a tensioning system is described in U.S. patent application Ser. No. 16/188,990, filed Nov. 18, 2018, owned by the assignee of the present invention, the contents of which is hereby incorporated by reference.

This invention is a heating method for consolidation of composite material in which multiple laser heat source modules, are mounted to the AFP head assembly ahead of the nip point, i.e. the convergence of the tow (fiber material) and the substrate by aid of the compaction roller, with the heat output pointing toward and in line of sight with the nip point. One laser heat source module is mounted on centerline with each tow. Laser heat source modules are each separately wired and plumbed. When energized they emit infrared energy form one face. Lanes of tow for an AFP machine will be anywhere from 1-32. If a multi-lane infrared laser heating system was designed for each of these machines that would be thirty-two different designs. A better solution, disclosed herein, is to provide one type of laser module mounted to service one lane and then add similar modules as required based on the number of lanes. The one design of laser heat source module fits all thirty-two machine configurations.

For ½" tow, over 100 W of continuous rated infrared radiant heat is required for each lane. Water cooling of the laser heat source module also is most likely or typically required. The heating device thus becomes an enclosed module with both electrical and water connections. There are size restrictions on the heating module to meet the mounting requirements of the present embodiment. The heating module is allowed at most 0.5" of width in order to mount on centerline with the respective tows. It cannot project downward toward the substrate more than a few inches because it will drag on the substrate. Further, it cannot project upward more than a few inches, because it will interfere with the AFP head.

Figure 17:
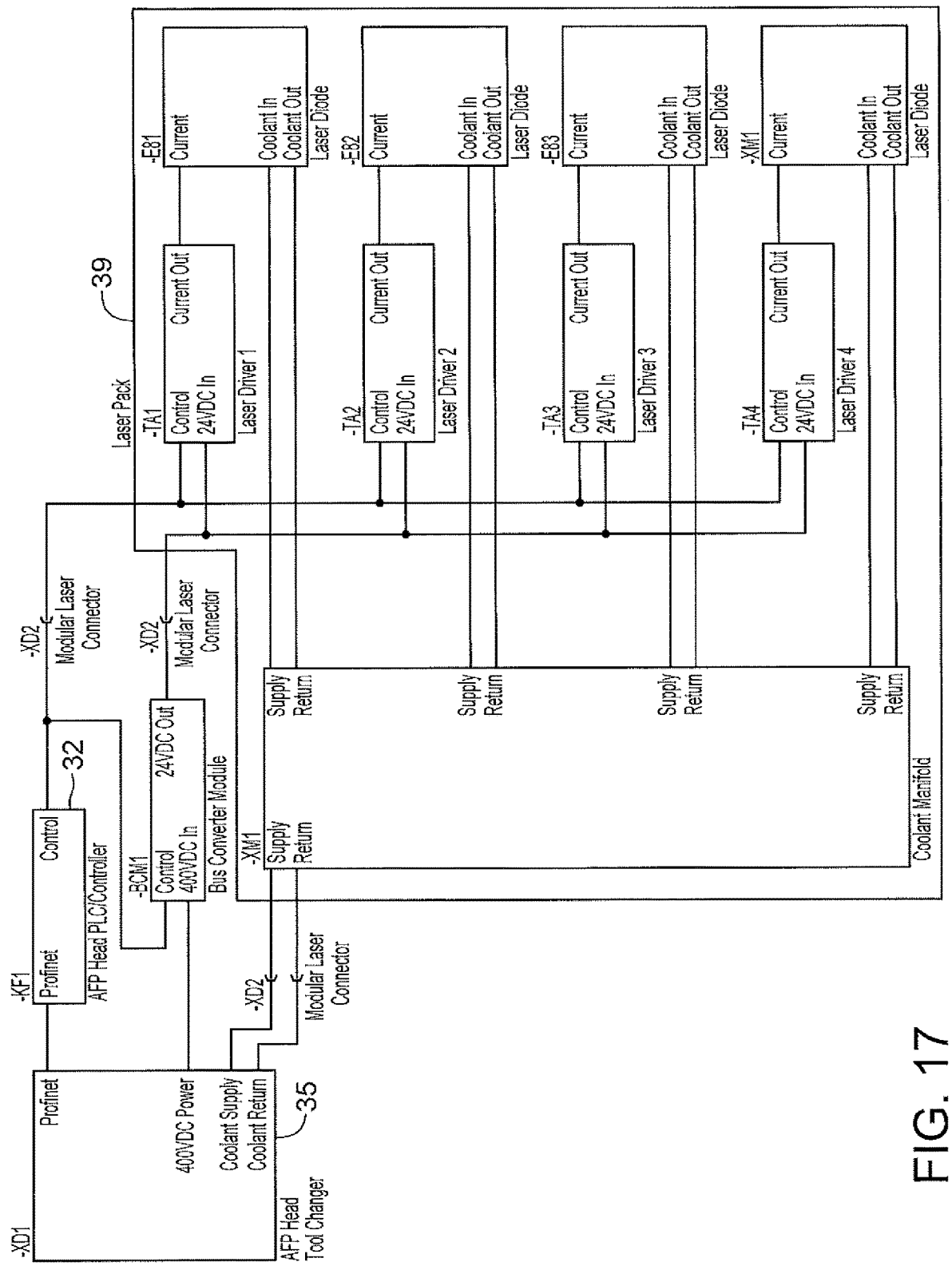
FIG. 17 is a connection diagram for both electrical and cooling water lines from the ATI interface to modular lasers, which facilitates the modular AFP head.

The laser heat source modules must each be separately wired back to their own laser controller module which are controlled by a computer. The cooling water connections for each laser heat source module must be separately plumbed. The electrical and water connections for this invention for a plurality of lasers are shown in FIG. 17. A modular AFP head includes a tool changer 35 and an AFP head controller/computer 37. Connections are made for power, coolant supply and coolant return and control for each laser pack channel 39. One channel is shown in FIG. 17. The present embodiment includes four channels. Each channel pack includes a bus converter and a plurality of four laser heater diodes and drivers. The infrared heater module is only energized when the respective tow is fed.

In a common embodiment of this invention, the tows are each 0.5 inch wide, separated by a very small distance, for instance 0.010 inch. In the present example, sixteen tows are provided, forming a course. It should be understood, however, that different size tows can be used, including, for instance, common widths of 0.125 inch, 0.25 inch, 0.5 inch, 1.5 inches. Common numbers of tows a head can lay down are one, two, four, eight, sixteen, twenty and thirty-two. The most popular AFP head size is sixteen tows with each individual tow being 0.5 inch, so that a head will lay down a course eight inches wide. The tows from an AFP head are maintained in alignment by a tow guidance mechanism 26, another common device for AFP heads, as the tows are directed to a compaction roller 28. Compaction rollers are generally cylindrical, and are controlled to apply pressure against the tows as they move for application to the substrate 30. The compaction rollers are typically pneumatically pressed down to the substrate surface. The compaction rollers may be different sizes, depending on the particular application, and are usually made of a flexible material. Force is applied sufficient to press the tow onto the substrate, adhering the tows thereto.

Figure 7:
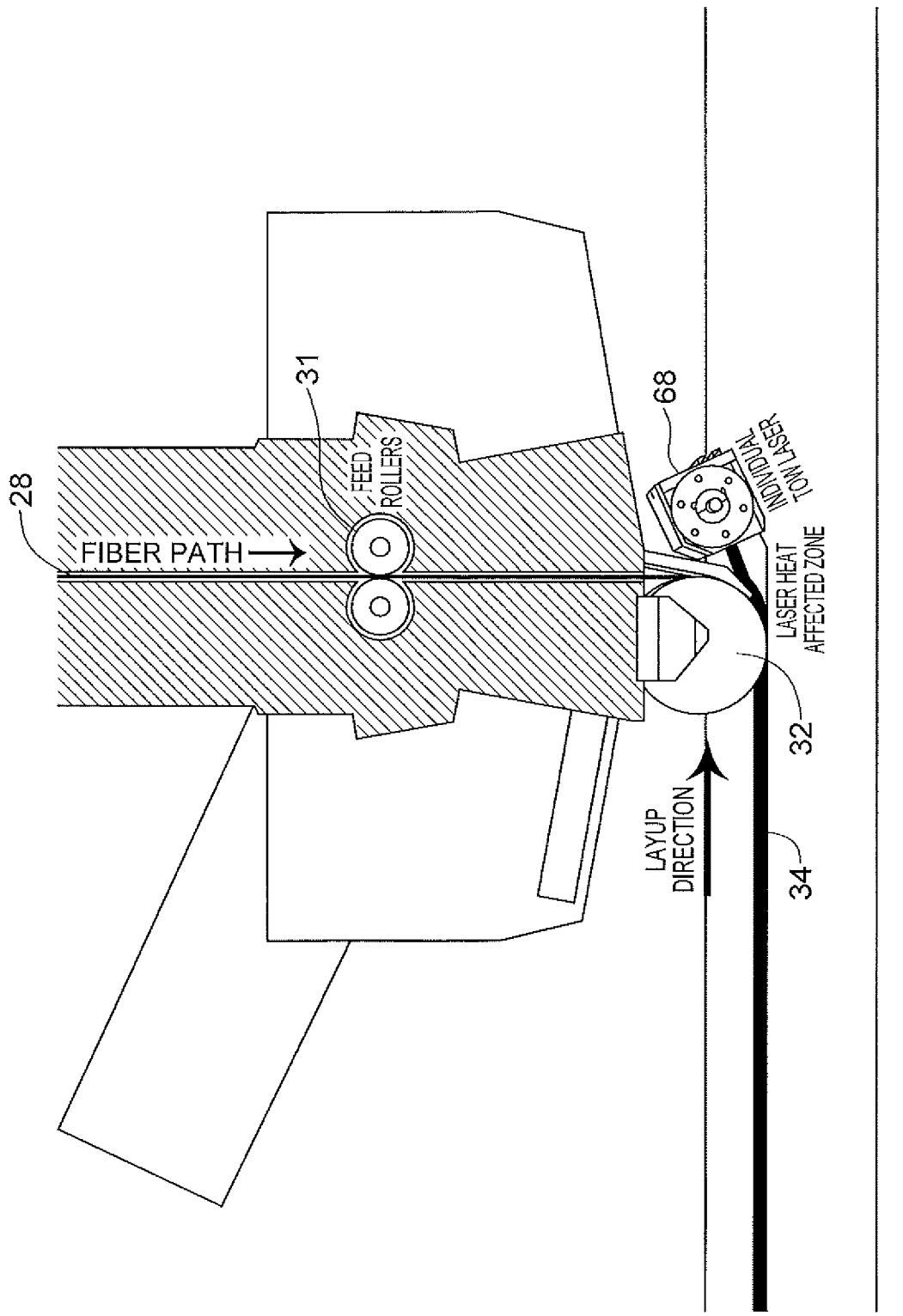
FIG. 7 is an end view of one embodiment of the fiber tow heating system of the present invention.
Figure 8:
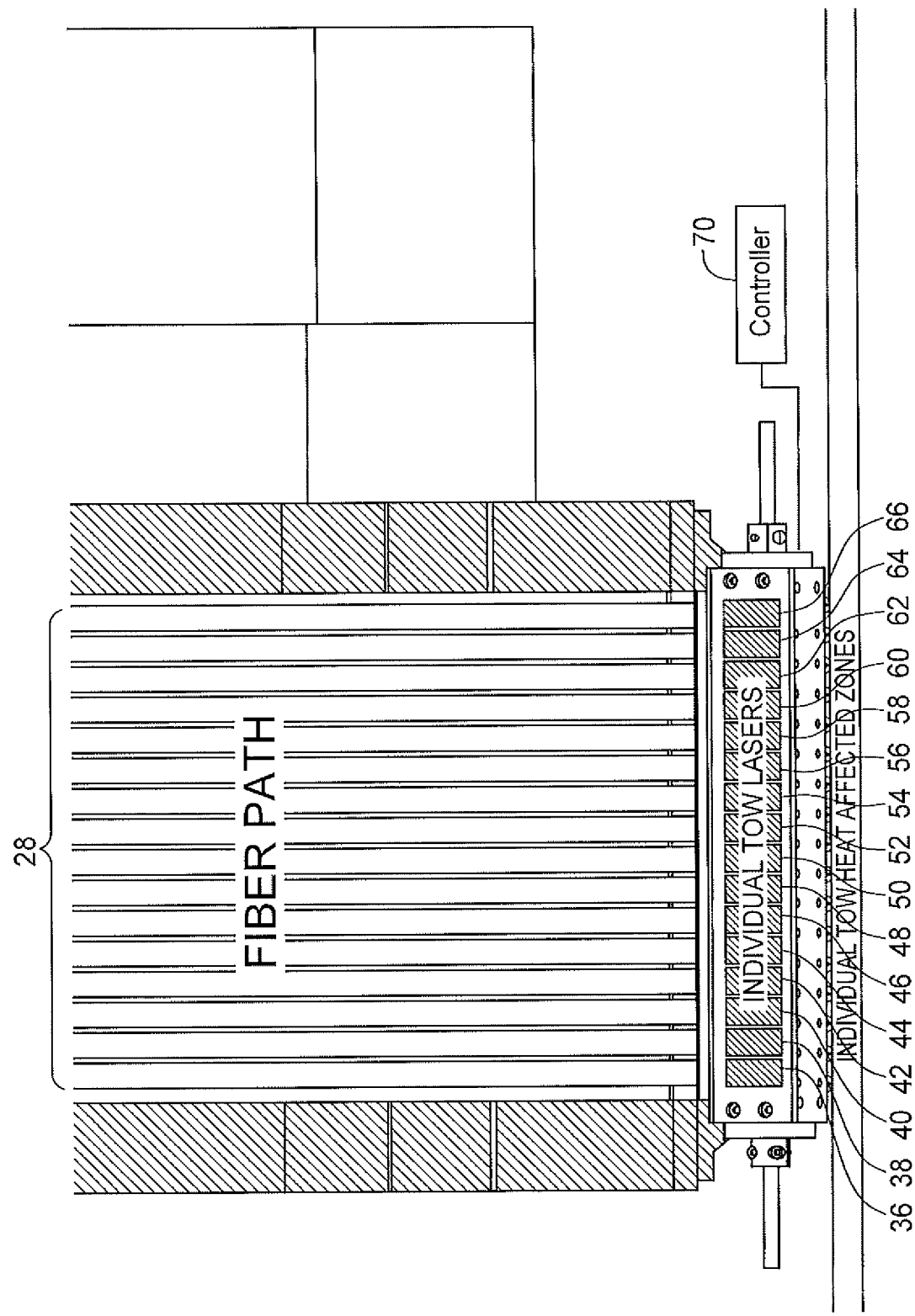
FIG. 8 is a front view of the heating system of FIG. 7 for a full course.

In the present invention, referring now to FIGS. 7 and 8 for one embodiment, there are sixteen tows and sixteen individual heat sources aligned with each tow. The tow path from the AFP head is shown at 28, with feed rollers 31 for tow guidance and a compaction roller 32. Tow layup is shown at 34 on a substrate 33. For instance, in an arrangement where there are 16 tows or lanes, there are 16 individually controlled laser infrared laser heat sources modules 36-66, shown as a unit 68 in FIG. 7. A separate laser heat source module is provided for each lane. The heat sources are fixed in a position to provide focused heat energy to their respective lanes. Each heat source's energy is individually controllable by a control system 70 (FIG. 8). Control system 70 can switch the individual laser heat source modules on and off, depending on which tows are to be fed. It can also apply analog control of the heating by varying the current of each lane with +precision. Analog control of the laser heat source modules can be implemented by voltage control, pulse control or pulse frequency control. Sensors can also be deployed on each lane to measure the temperature of the tow at the nip point and a multi-feedback system can also be deployed.

For narrow tow width it is not possible to put one tow in front of each laser heat source module. As an alternative, it is practical to put two tows in front of each laser heat source module, as shown in FIG. 13C, or for even narrower tows, four tows in front of each laser heat source module, as shown in FIG. 13D. All the benefits result if the operator is cautious to always feed all tows for lanes with lasers on and feed no tows for lanes with lasers off.

Figure 11:
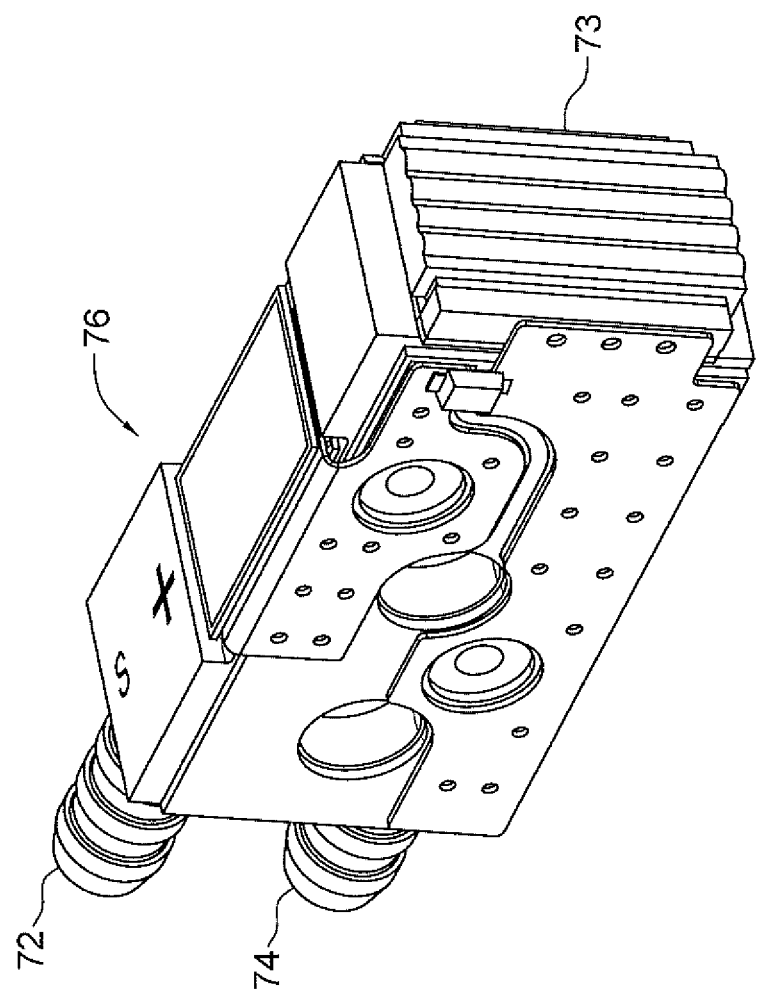
FIG. 11 is a schematic view of a T3 laser heat source module with a mounted fast axis lens.

Different infrared laser heat source modules can be used. One embodiment of the present invention uses the Lasertel laser diode heat source, Model LT-6500 in a T3 package, which is identified heareafter as a T3 module or T3 for explanation. Other laser heat source modules can be used. The T3 module 71 is shown in FIG. 11. The physical package of this laser heat source module is approximately a rectangular solid, 9.3×13 mm in cross section and 30 mm deep. The infrared radiation come off of one 9.3×13 mm face 73 and that face is mounted such that it is pointing at and in line-of-sight with the nip point. Two hose connectors 72, 74 for water cooling extend out of the opposing end of the module. Fortunately in this embodiment one of the two dimensions, the 9.3 mm dimension, is less than the 12.7 mm (one-half inch) centers that the individual laser heat source modules must be mounted on. Each laser heat source module T3 can provide 240 Watts of infrared energy which is more than adequate for consolidation of thermoset at a high processing speed of 4000 inches per minute. It is also adequate for dry fiber and thermoplastic resin at a slower speed.

In one variation, the laser heat source modules can be pointed at the substrate slightly ahead of the nip point and the same benefits of this invention result.

In another variation, the lasers can be mounted slightly off the centerline of the tow but if the laser heat window is pointed at the tow center the same benefits of this invention result.

When using the T3 module on ½" tow, the LED emitting bars are fixed vertically because only the smaller dimension allows mounting on ½" centers. In the vertical direction of the LED bars (called the slow axis for an LED bar) the dispersion angle is small, close to 10 degrees included angle, so that the radiant heat beam spreads very little in that axis. The emitting zone is 10 mm in the vertical dimension and the mounting is 60 mm from the nip point; therefore the heat window spreads out to 20 mm. Substantially, all of the heat in the vertical axis assists the consolidation of the tow.

For the vertical LED bars in the transverse direction (called the fast axis for the LED bars) the spreading angle is greater, about a 36 degree included angle, The light emitting window in the transverse direction is 3.3 mm. This laser heat source module is mounted approximately 60 mm away from the nip point. The heat beam will spread out to 40 mm without lensing. This is effective but might not be optimum. The 40 mm spread means that the infrared heat from one laser heat source module is impinging on three tows, the principal or associated tow as well as the two adjacent tows, one on each side. This means that the tows on either end of a course will get less heat than tows toward the center, which is not acceptable.

Another disadvantage of infrared heating spreading out across three lanes is the tendency to cause roller wrap. The compaction roller must always be wider than the tows being fed. When a previously laid down tow or a portion of a tow is heated it can become sticky, so that it can stick to the compaction roller and roll up on the compaction roller. This causes the AFP machine to stop until the condition is repaired.

Figure 12:
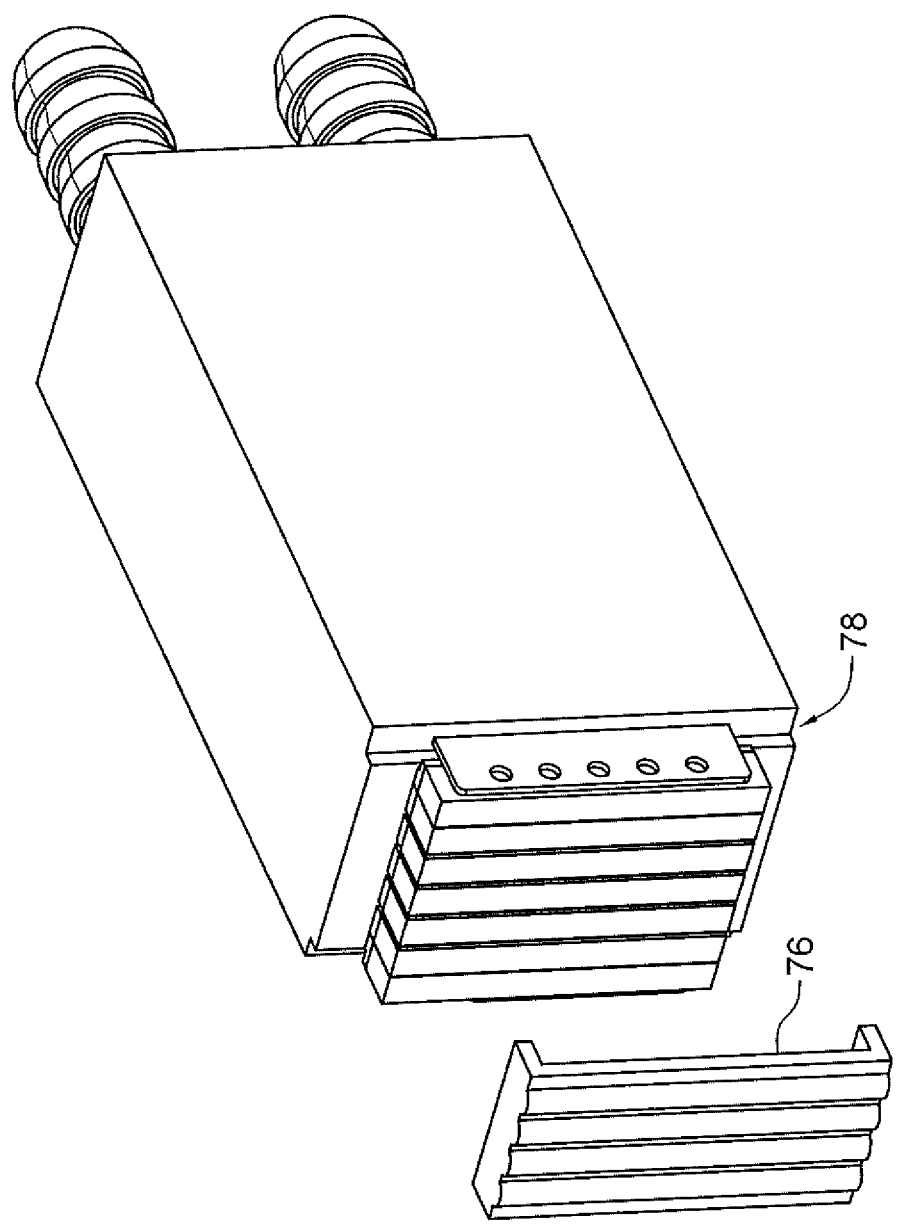
FIG. 12 is a schematic view of a T3 laser heat source module with the first axis lens removed for illustration.

A way to improve the performance of the AFP head using this invention is to provide a focusing lens for controlling the spread of heat in the direction transverse to the tow length (fast axis for the LED bars). A compact and low profile lens 76 can be mounted on the face of the laser heat source module which restricts the spread of the infrared heat to fifteen degrees of included angle. Such a single lens 76 is illustrated pulled away from a T3 laser 78 in FIG. 12. The heat from a laser heat source module is then only impinging upon its associated tow. An available, suitable lens has an included angle of fifteen degrees and the heat beam spreads out to 16 mm width at a 60 mm distance, just slightly over ½", which is ideal. Because each laser heat source module only heats up its associated tow, this provides uniform heating across the width of the tow course regardless of how many tows are fed. The laser heat source modules can be switched off for tows which are not fed without concern for disrupting the process for the tows that are being fed.

The focusing lens added to the face of the laser heat source modules improves the concentration of radiant energy on the corresponding tow and so that it does not impinge on the adjacent tows on either side, reducing the likelihood of a roller wrap. In one lens example tested the heat distribution was such that the adjacent tow on either side only received 16 percent of the total radiant heat. Therefore, they are safe from roller wrap.

Figure 1:
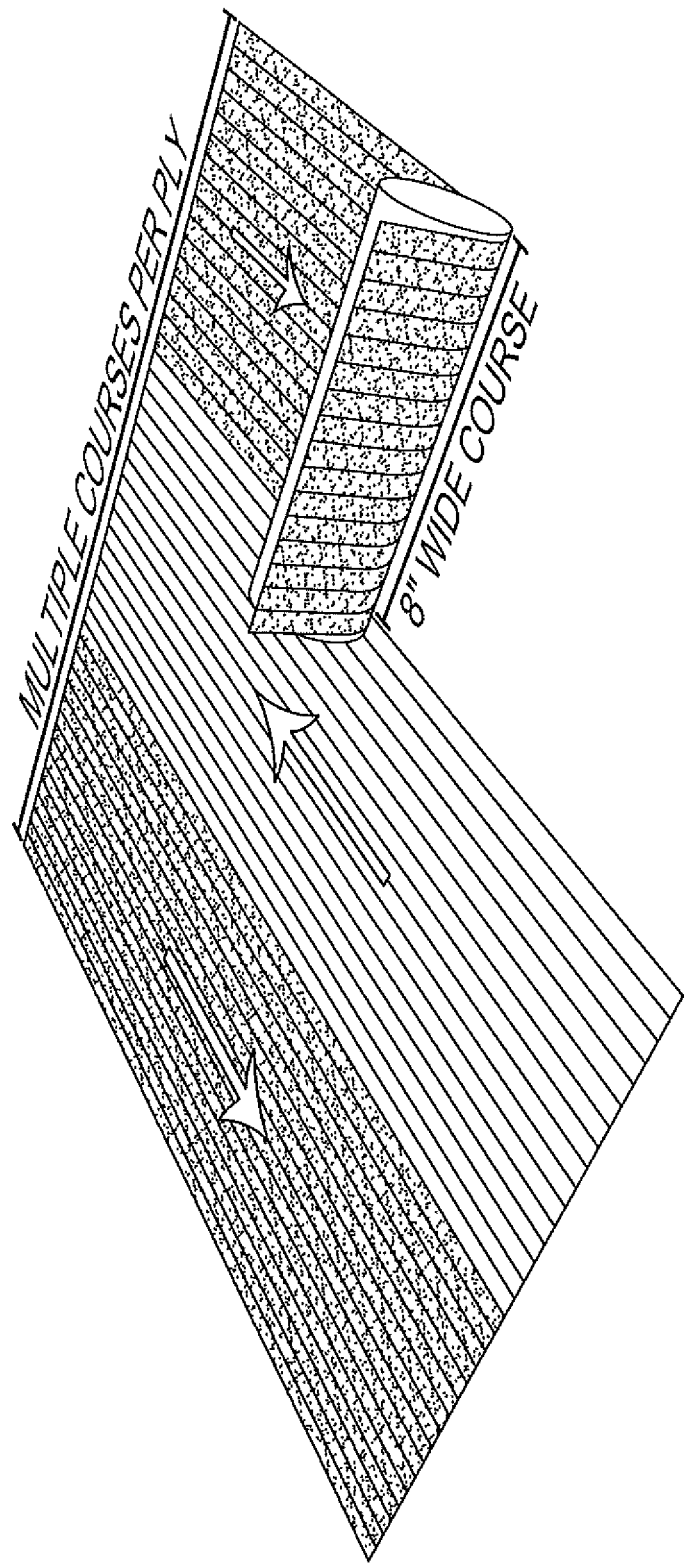
FIG. 1 is an example of a prior art course for fiber placement 8" wide.
Figure 2:
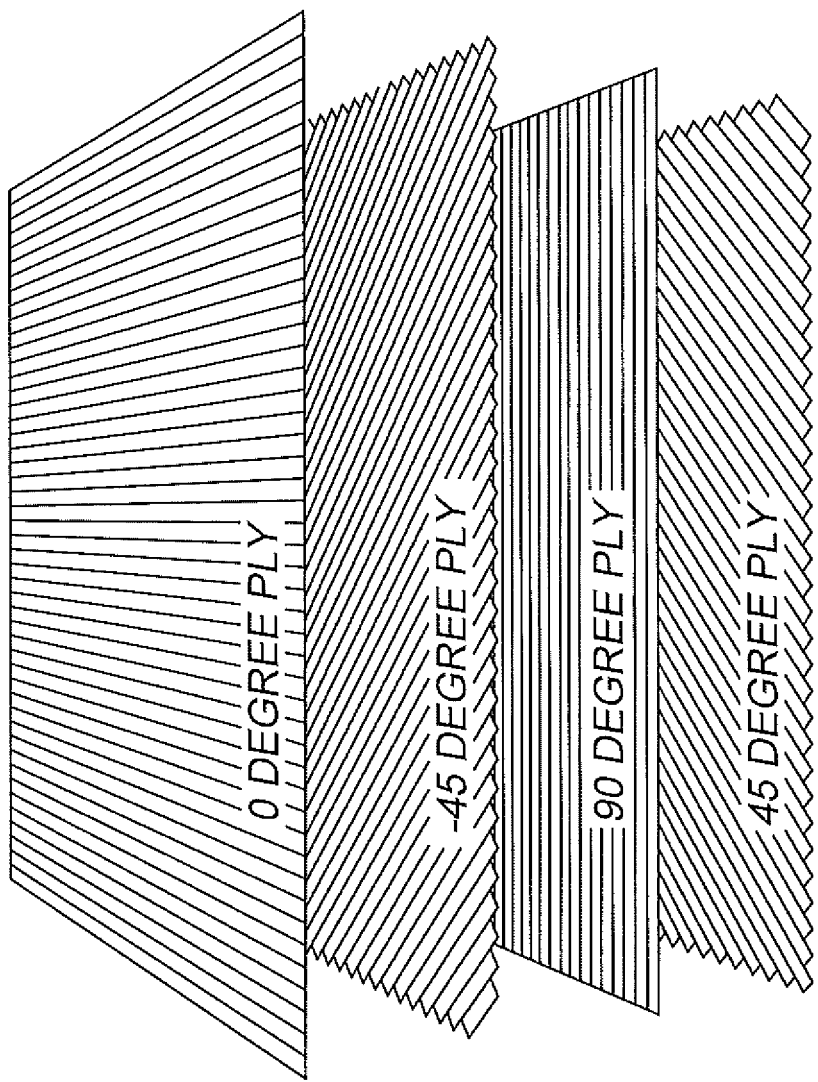
FIG. 2 is a diagram showing a plurality of orientations of fiber courses.
Figure 3:
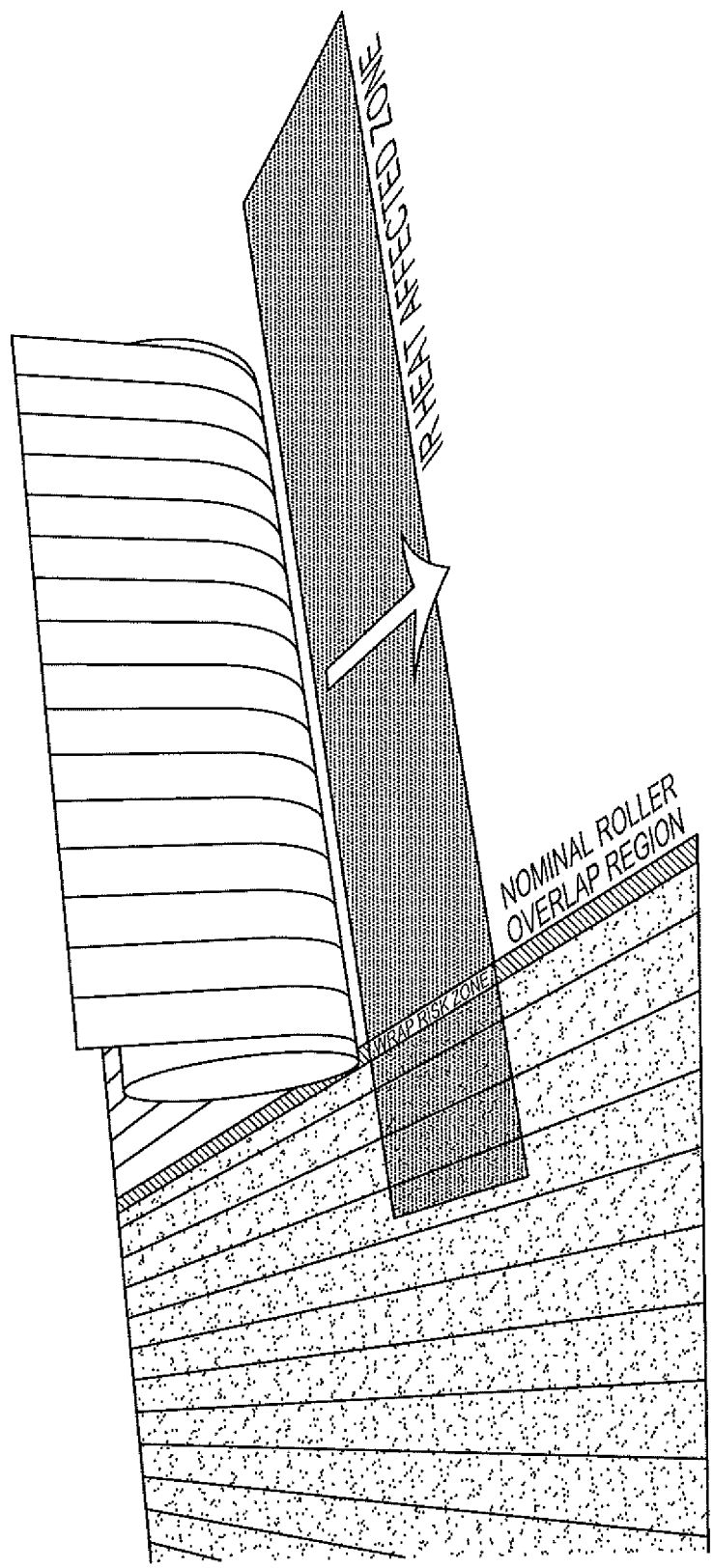
FIG. 3 is a diagram showing a roller wrap risk zone (edge) for a fiber course.
Figure 13A:
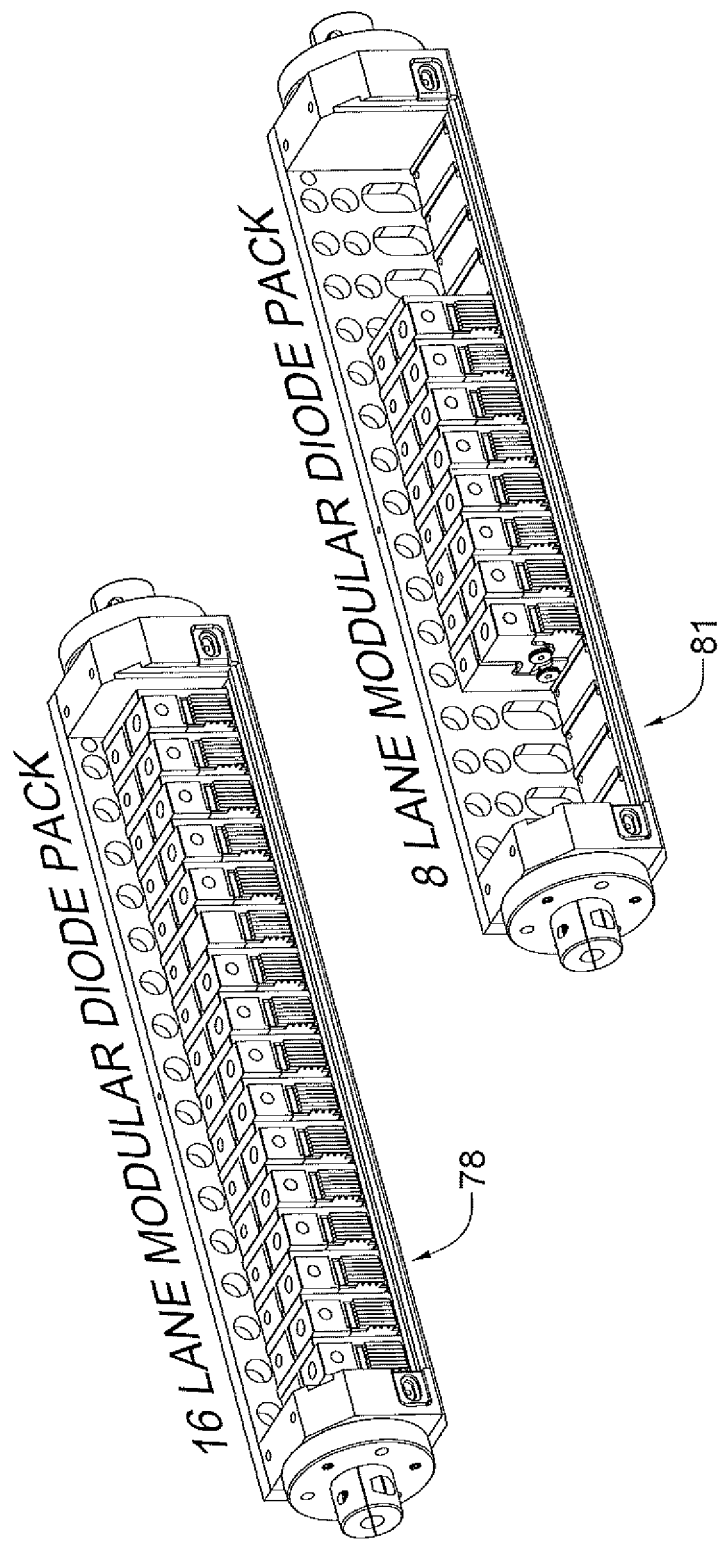
FIG. 13A shows two mounting racks for 16 laser heat source modules on ½" centers one with eight modules and the second with sixteen modules as required, one for each tow.
Figure 21:
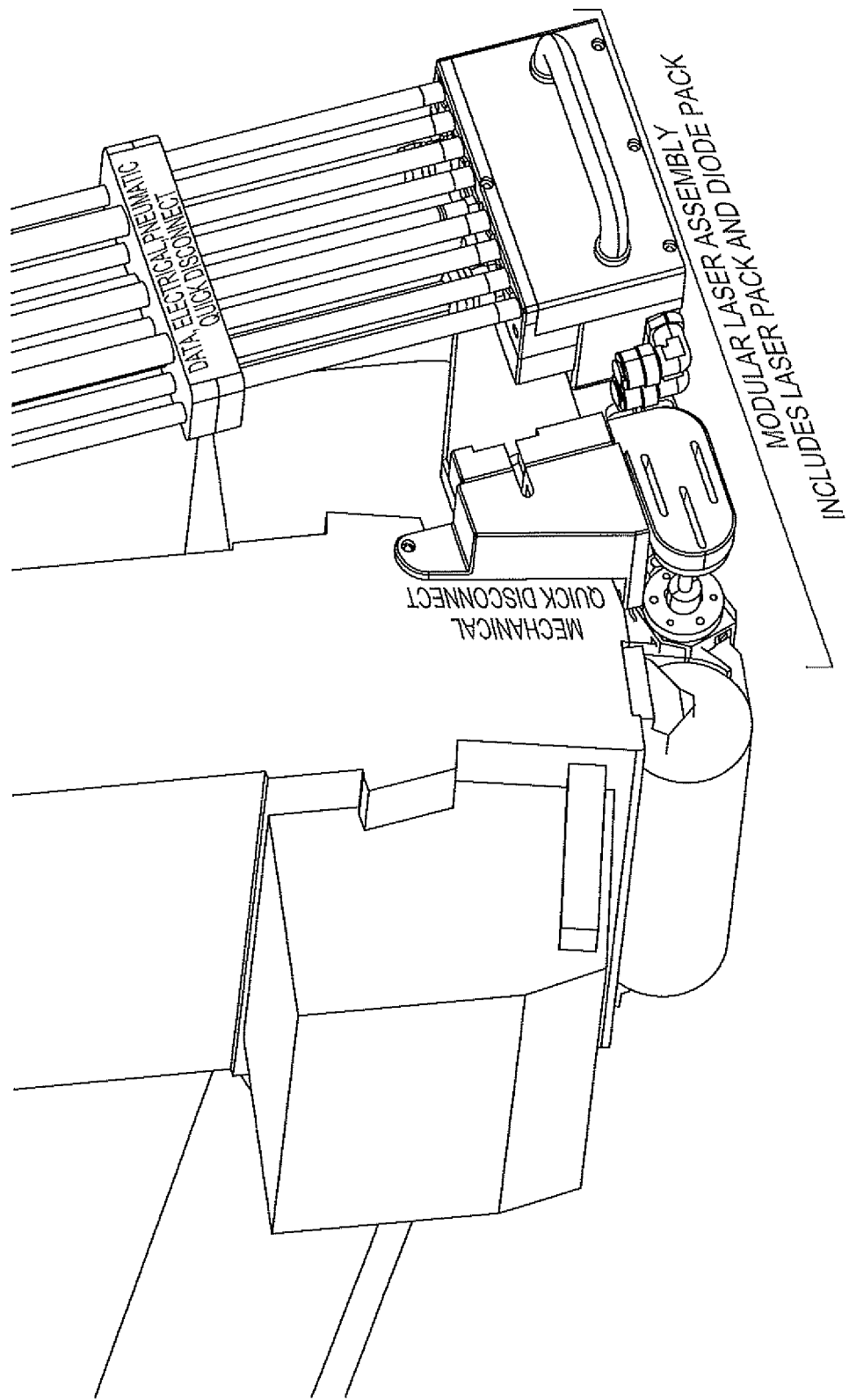
FIG. 21 shows a portable heating system connected to the AFP head.
Figure 22:
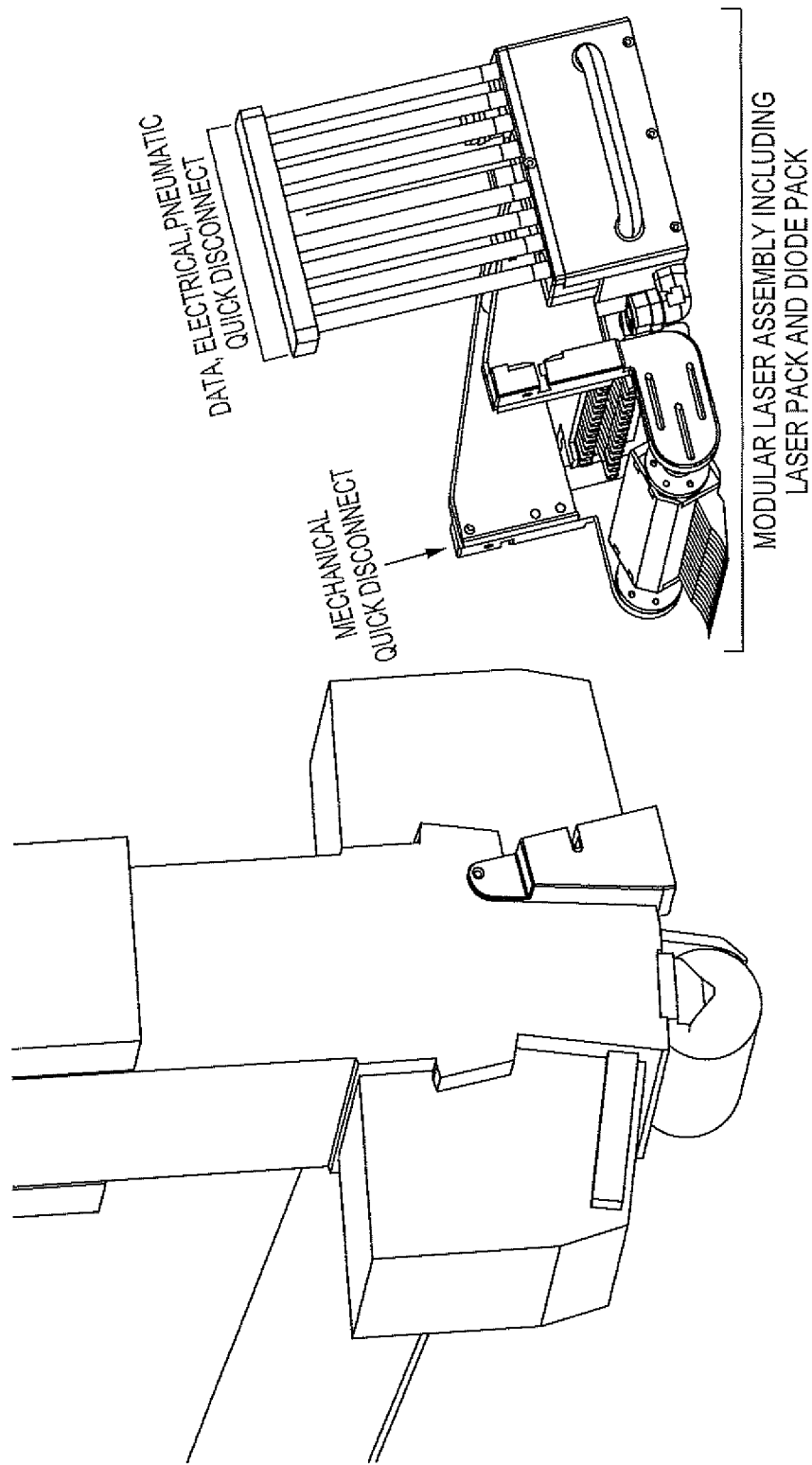
FIG. 22 shows a portable heating system detached from the AFP head.

FIG. 13A shows a mounting bracket 81 for attaching the laser heat source modules to the AFP machine. This is a simple metal bracket in the embodiment shown with a set of mounting holes for each heat source module. Either eight or sixteen laser heat source modules are mounted, shown in FIG. 1, depending on the number of tows. If the number of tows is increased from sixteen to twenty tows it is easy to make the bracket four spaces longer and add four more laser heat source modules. The mounting bracket is combined with associated electrical and fluid components and becomes a portable heating system which can be removed from one AFP head and mounted to another AFP head. This is illustrated in FIG. 21. The connector points for disconnecting and reconnecting the portable heating system are illustrated diagrammatically in FIG. 17. The electrical and fluid, such as water, connectors are released from the first AFP head. The portable heating system is detached from the first AFP head, the portable heating system attached to the second AFP head and the electrical and fluid connectors are reattached on the second AFP head. In FIG. 21 the portable heating system 80 is attached to the AFP head. FIG. 21 illustrates a portable heating system which includes power, data, pneumatic and coolant quick disconnect capability 83, relative to an AFP head 85. In FIG. 22 the portable heating system is shown removed from the AFP head. It can now be used on another AFP head. The portable heating system optionally can incorporate laser drivers, fluid controls, and these can be shared with multiple heads along with the lasers.

Figure 14:
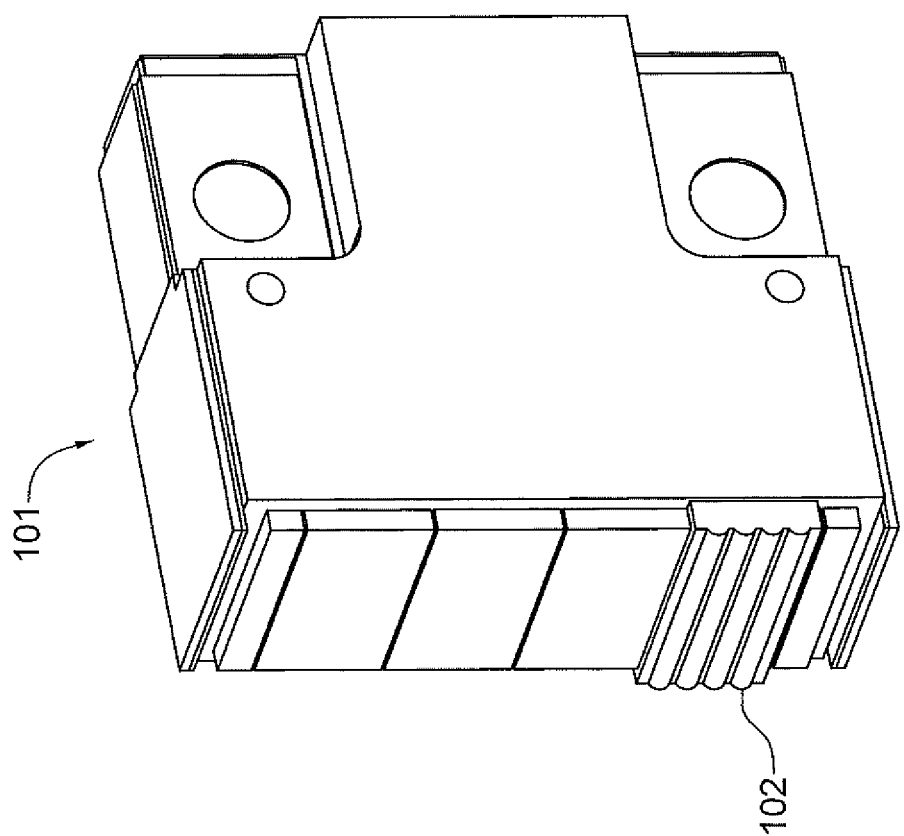
FIG. 14 shows a T6 Lasertel module.

A T6 laser heat source module package is another, i.e. second, embodiment. The T6 package is larger but can still be effective on laying down and consolidating ½" tow. FIG. 14 shows that a T6 laser heat source module 101 is 11.5 mm wide, with a 10 mm emission width, 28.2 mm high with a 4.4 mm emission height and 25 mm deep. The width of the T6 laser heat source module is the only dimension below the ½" tow width. Therefore the LED emitting bars are horizontal, transverse to the tow length. The transverse axis is now the slow axis. For a 100 mm distance to the nip point the 10 degree included angle of the slow axis without any lensing would output a heat beam 27 mm wide, which is too wide, heating the neighboring tows. The LED bars are 10 mm wide, so a 1 degree collimating lens results in a heat beam 11.74 mm wide which is perfect.

Figure 15:
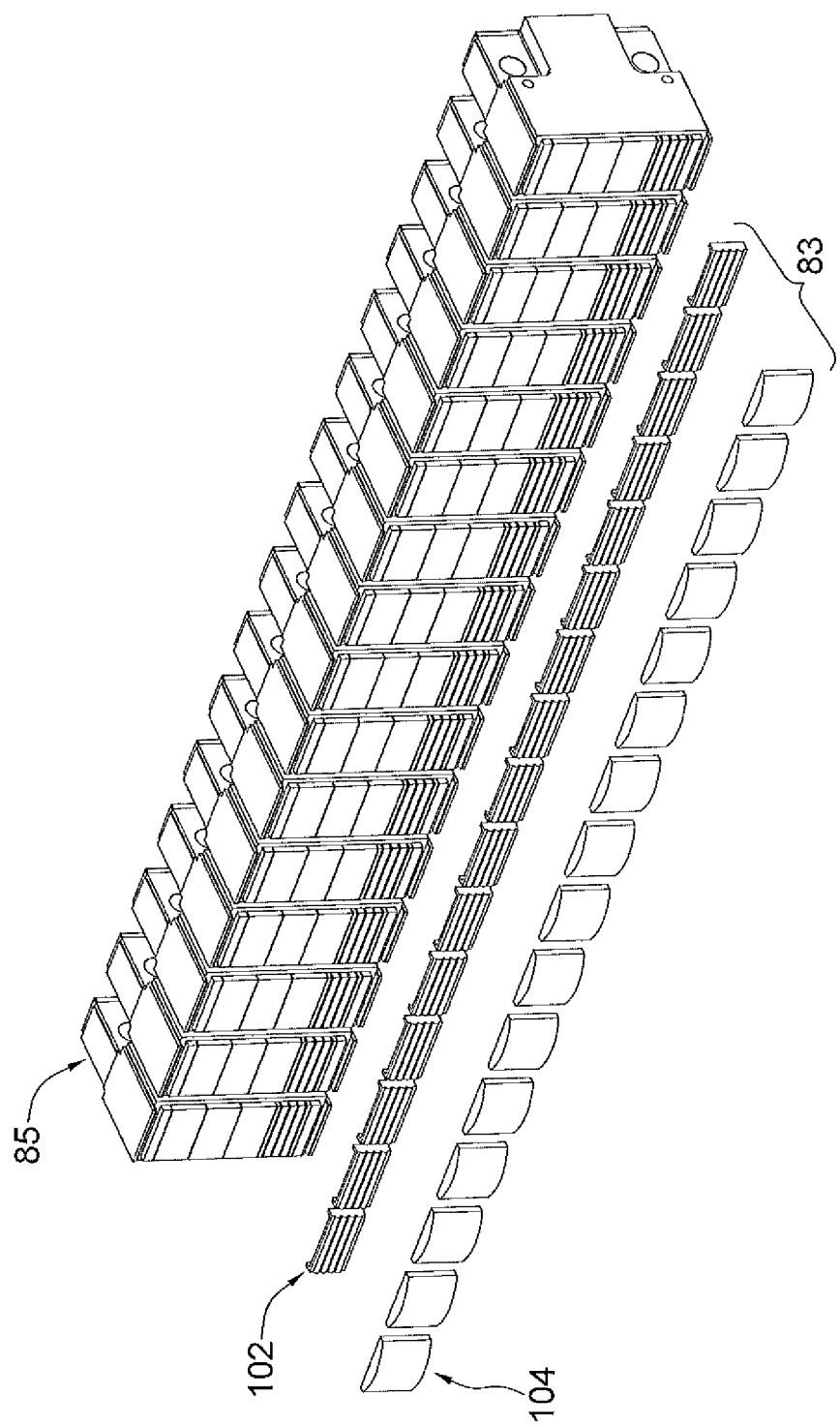
FIG. 15 shows sixteen T6 laser modules mounted on one-half inch centers with both slow axis and fast axis focusing lenses.

To achieve the best result with the T6 laser heat source module the fast axis will also be lensed down to a 1 degree included angle to concentrate on the nip point. FIG. 15 shows the T6 laser heat source modules 85 and the dual lenses used for the T6 pulled away from the T6 modules for clarity. The slow axis lenses are shown at 104. The fast axis lenses are indicated at 102. The 1 degree included angle lenses are easy to obtain.

Figure 16A:
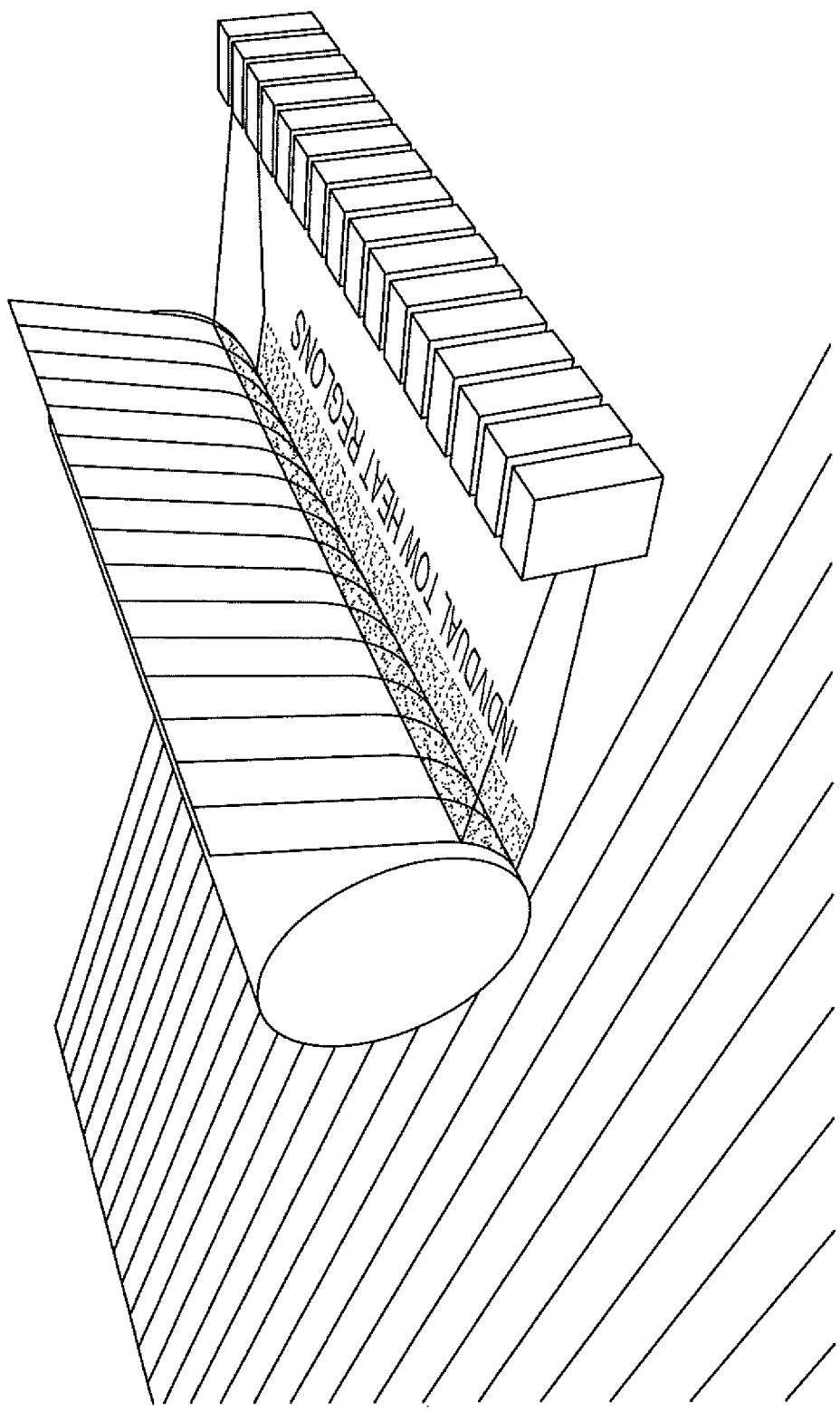
FIG. 16A shows the heat affected zone by sixteen T6 heat source modules directed at the nip point

FIG. 16 illustrates the row of sixteen T6 laser heat source modules 89 with line of sight on the nip point 91 for a head with a course sixteen modules wide. FIG. 16A illustrates the heat affected zone for these sixteen laser heat source modules.

Figure 9:
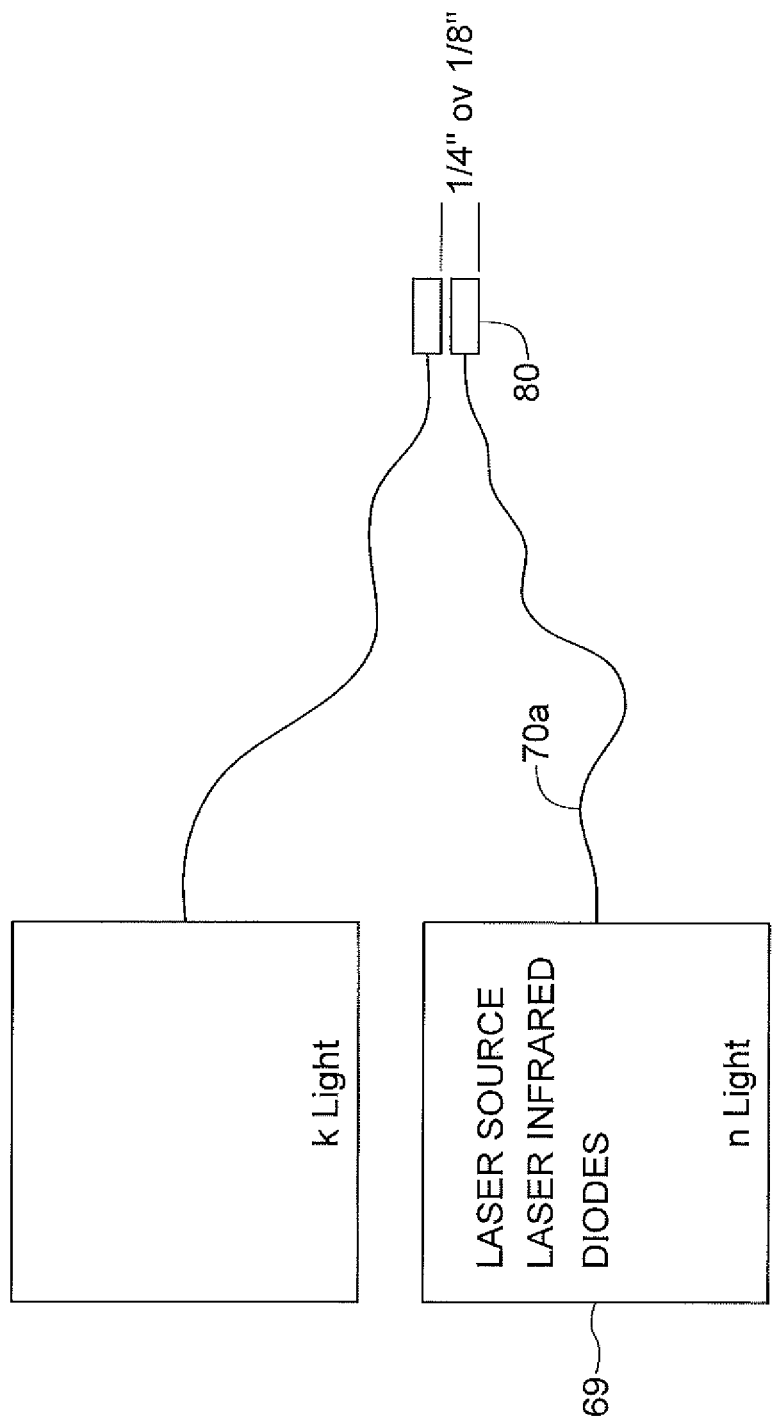
FIG. 9 is a laser heat source consisting of a terminating lens mounted to the nip pint and a fiber optic connection to a laser infrared source, which is mounted further away.
Figure 9A:
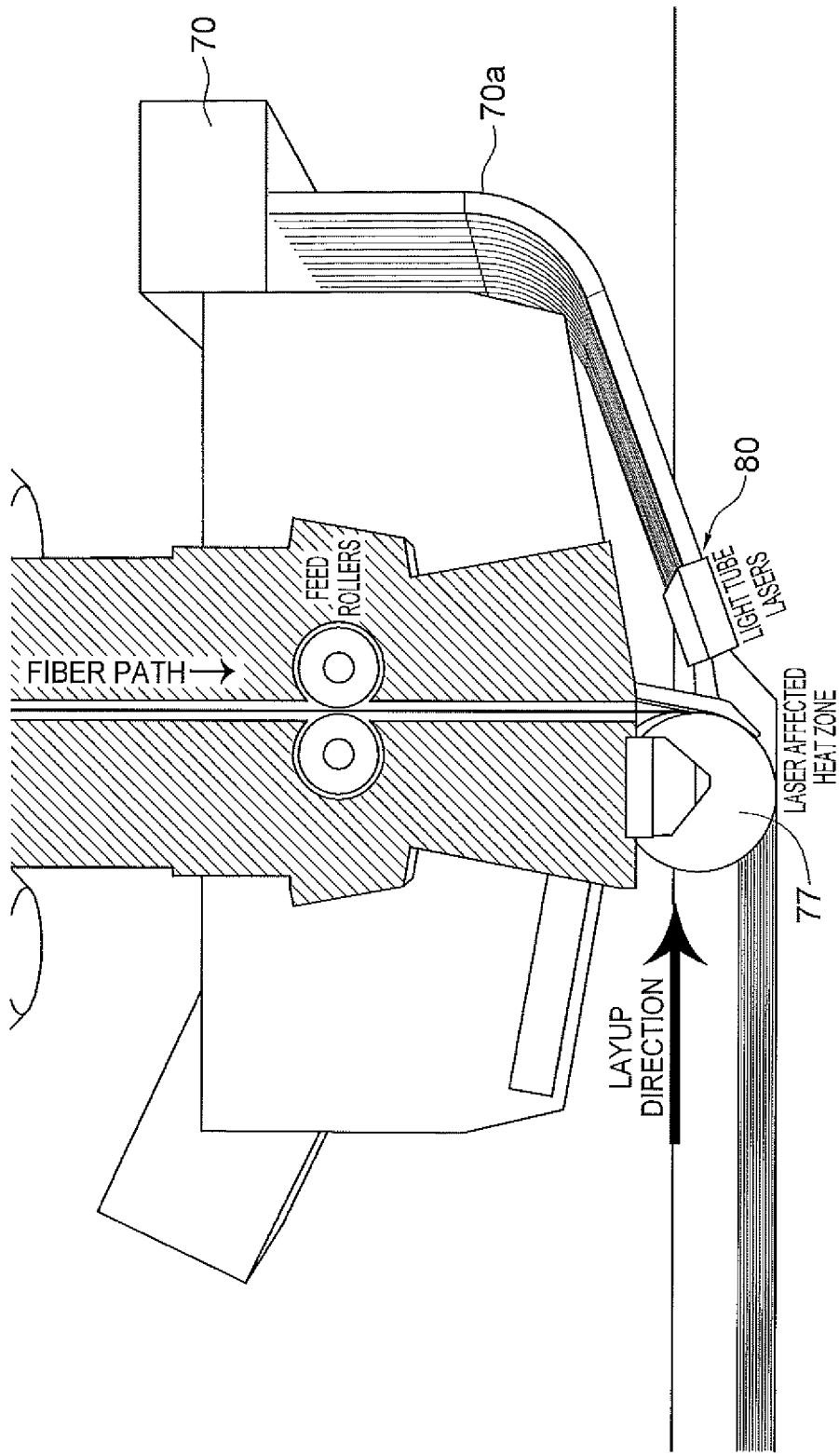
FIG. 9A is an end view of terminating optics mounted near the nip point and laser infrared source mounted further back.

Another embodiment for tow width less than one-half inch shown in FIG. 9. For tow width less than ½", a different design is used. Laser heat source module puts infrared energy into a fiber optic cable. At the end of the fiber optic cable is a terminating lens that focuses the energy onto the corresponding tow. The focusing lenses can be attached to fiber optic cables without creating large packaging interference near the tool point of the machine. This also enables the beam outlets to be aligned at a pitch that is smaller than the passage of a laser necessary for that amount of power, thereby effectively increasing the heater power density at the tool point. Most important are mounting the terminating lenses on ¼" centers for ¼" tow width and ⅛" centers for ⅛" tow.

Figure 10:
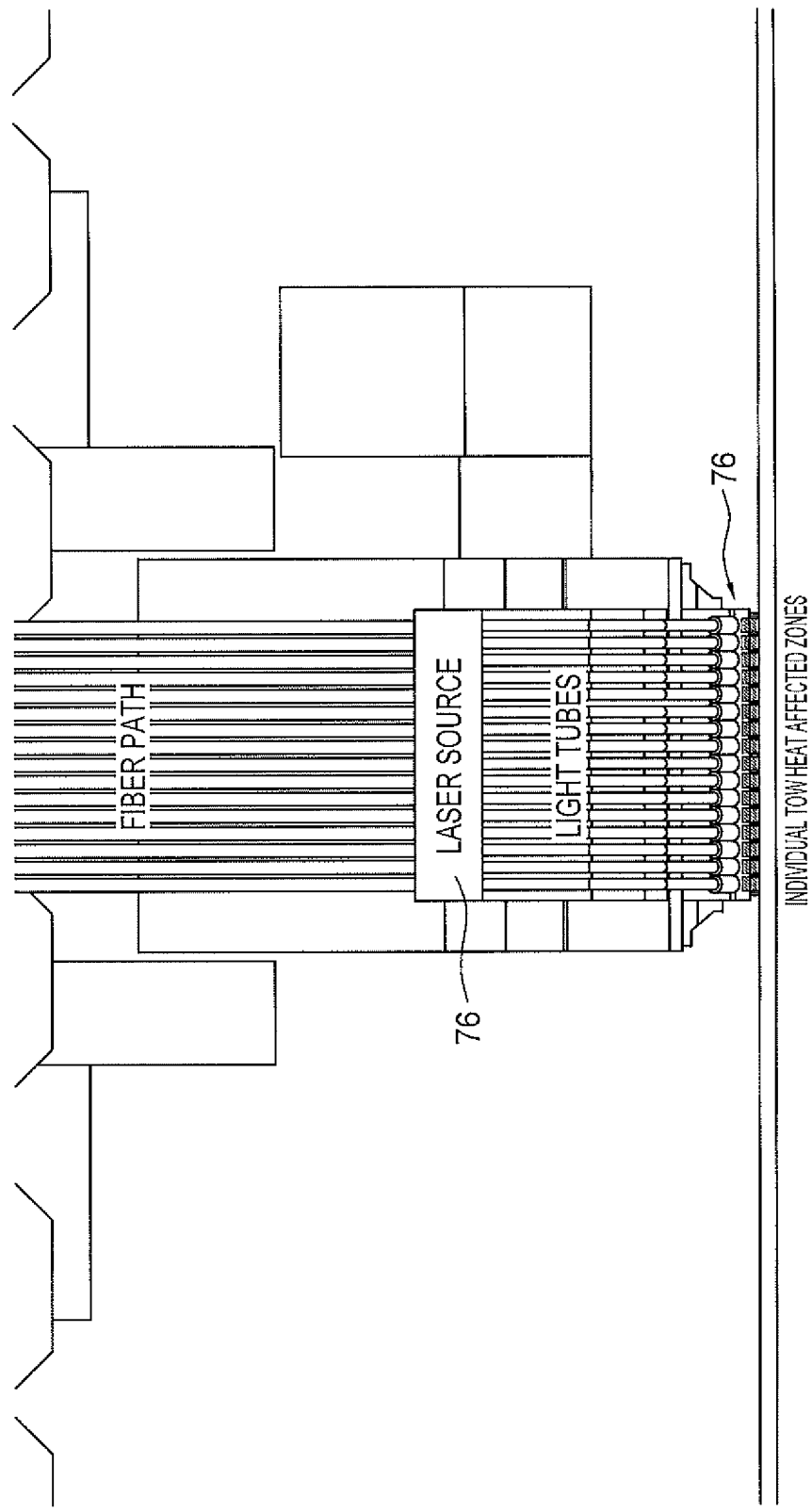
FIG. 10 is a front elevation of the embodiment of FIG. 9A for a full course.

This embodiment shown in FIGS. 9 and 10 is useful for narrower width tows (¼, ⅛ inch for example). The individual laser modules previously described in the first embodiment are too wide to mount on centers for narrower tow such as ¼" or ⅛" tows. One of the purposes of this invention is to provide individual heat sources for each tow which can be individually switched on and off or analog as desired. Another is to provide heating elements which can be added to or subtracted from when the number of tows is increased or decreased.

As shown in FIGS. 9 and 10, the individual laser sources 69 may be mounted away to save space near to the compaction roller 77. The lasers 69 can be fiber-coupled 70a and attached to an optics lens package, shown at 80, which can be mounted on the tow centerlines. A commercially available laser source is made by nLGHT. These are too wide to be mounted on the ¼"centers required but they are mounted back away from the compaction roller. The terminating lenses are narrow and those are mounted on the close centers required and in line-of-sight with the nip point. The lens is designed to focus infrared energy on the associated tow. Each heater module is now in two parts, a lens part near to the compaction roller and a laser driver mounted further away, the two parts connected by a fiber optic cable. The laser made by nLight is capable of sending 200W of optical power down a fiber optic cable.

Figure 13B:
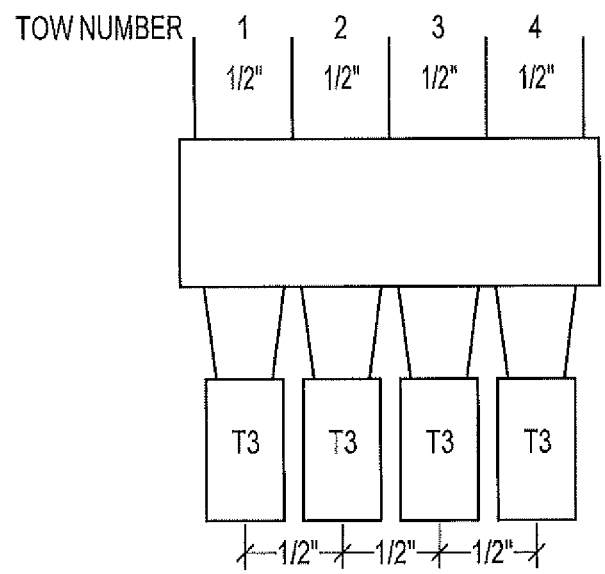
FIG. 13B is a simplified view of a plurality of laser modules mounted on ½" centers, each laser module heating one associated tow.
Figure 13C:
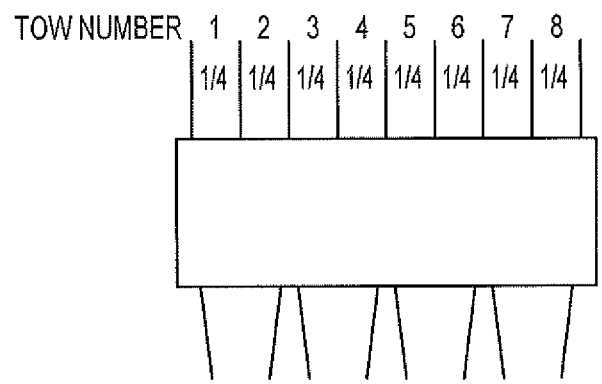
FIG. 13C is a simplified view of a plurality of laser modules mounted on ½" centers, each laser module heating two associated tows.
Figure 13D:
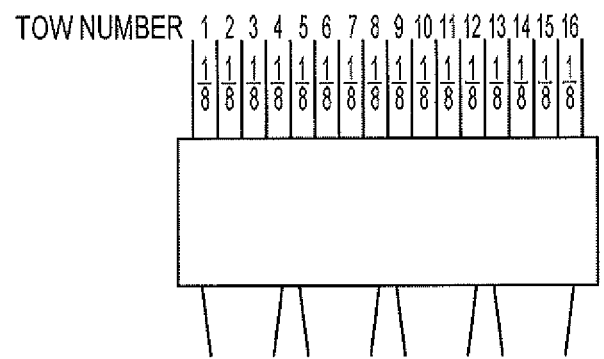
FIG. 13D is a simplified view of a plurality of laser modules mounted on ½" centers, each laser module heating four associated tows.

The laser heat source modules disclosed (T3) cannot be mounted on centers closer than one half inch. For one half inch tow, shown in FIG. 13B, one tow is positioned in front of one heat source module. For one quarter inch tow it is practical to put two tows in front of each laser heat source module, as shown in FIG. 13C. For one eighth inch tow, four tows are positioned in front of each laser heat source module, as shown in FIG. 13D. The reduced risk of roller wrap results if the operator always feeds all tows for lanes with laser heat source modules on and feeds no tows for lanes with laser heat source modules off.

For example, for one quarter inch tow, FIG. 13C, if it was necessary to "repair" tow 3 then it would be beneficial to pull up both tow 3 and tow 4 and relay both 3 and 4 to get the protection which this invention offers against roller wrap.

Figure 19:
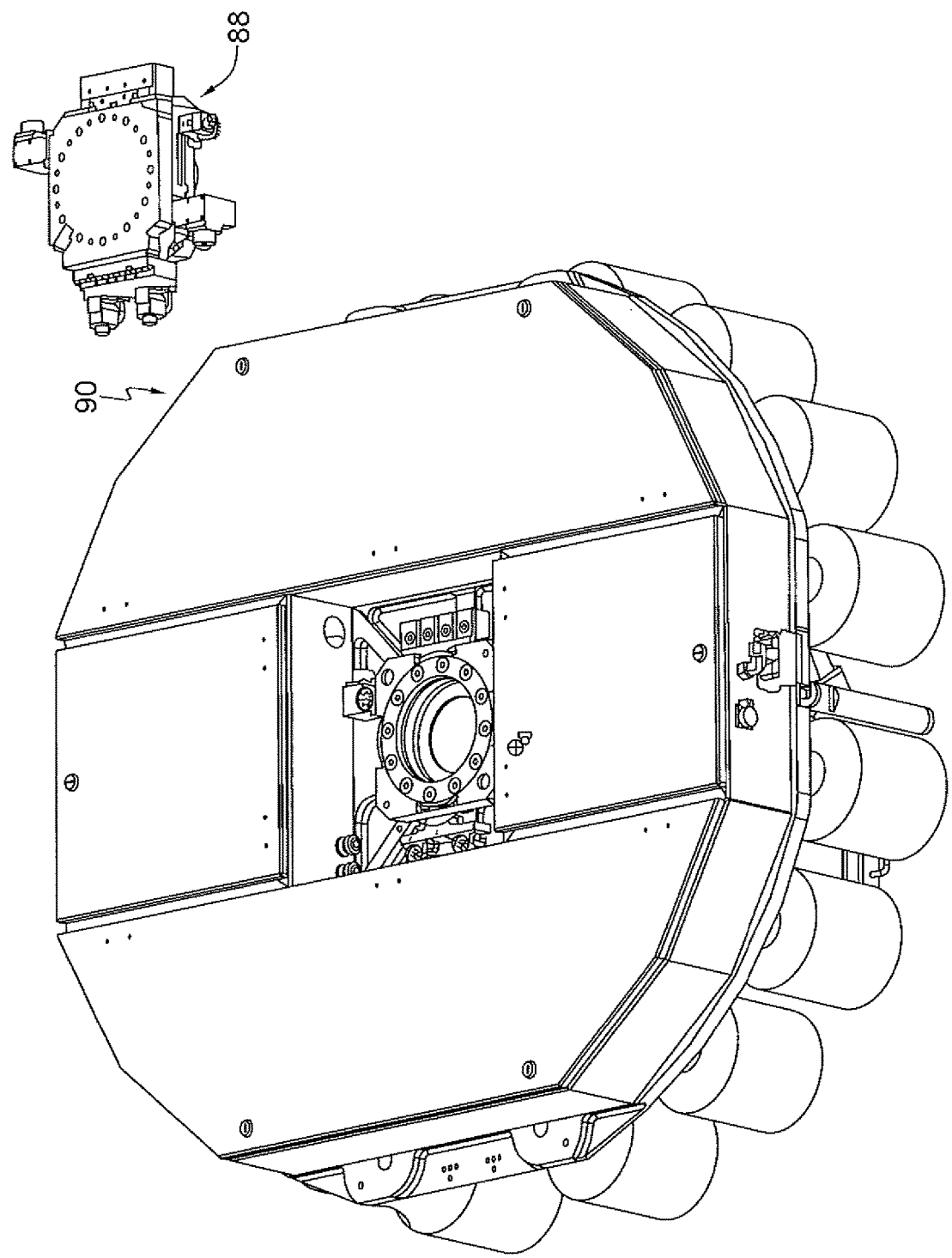
FIG. 19 shows an ATI interface for a modular AFP head.
Figure 20:
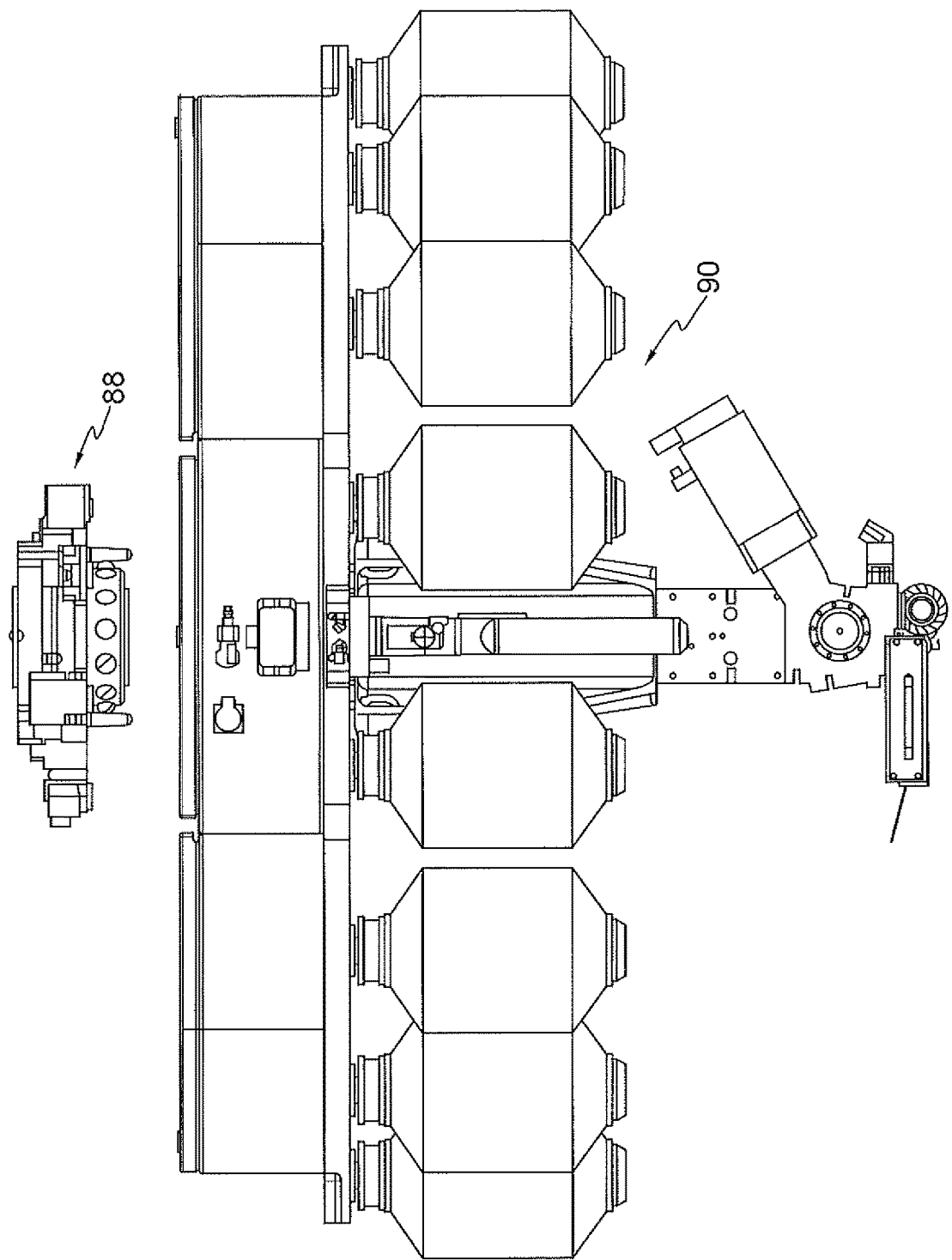
FIG. 20 in an elevational view of FIG. 19.

The AFP head can be modular so that it connects and disconnects from the AFP machine via a quick-change interface 88. ATI Industrial Automation of Apex, NC makes suitable interface devices, such as model QC-1310. This disconnecting device for the AFP head is shown in FIGS. 19 and 20. The machine side of the device is affixed to the distal end of the last joint of the machine which carries the load. When the AFP head 90 is mechanically picked up by the machine through the ATI interface 88, at the same time electrical and fluid connections are connected. The laser heating system of this invention works well in conjunction with the modular head. All sixteen Lasertel modules can be powered off of one electrical power bus that comes through the ATI interface. The 400VDC is stepped down to 24VDC by a device on the AFP head called a Bus Converter Module which outputs 24VDC. In one installation each Bus Converter Module supplies 24VDC to four Laser Drivers. Each Laser Driver has input power of 24VDC and outputs 7VDC 85 amps to each laser module in order to output the infrared energy. The arrangement is illustrated in FIG. 17, discussed above.

The laser drivers are individually controlled on/off by logic level (TTL) signals from a Programmable Logic Controller, such as one available from Siemens. Each laser driver also has an analog input control to adjust the current flow into each module and proportionally controls the infrared light output. That is controlled by an analog output from the programmable logic controller. For the T3 laser module that has been used, the maximum input electrical power is 595 W. The infrared light emission is about 50% of the input electrical so it exceeds the 200 W of infrared light required for each tow.

In addition, a pair of cooling water pipes can be connected when the ATI interface is connected. A pair of cooling water connections, one a chilled water supply and the second a return water pipe is adequate for all sixteen Lasertel heat source modules. Therefore this invention is compatible with and is not restricted by use on a modular AFP head, Reducing the number of connections through the ATI Industrial Automation interface reduces cost and improves reliability. After passing through the interface the electrical and chilled water connection can branch out and service multiple Lasertel LT 6500 heat source modules or similar modules provide an attractive configuration for a modular head.

Figure 4:
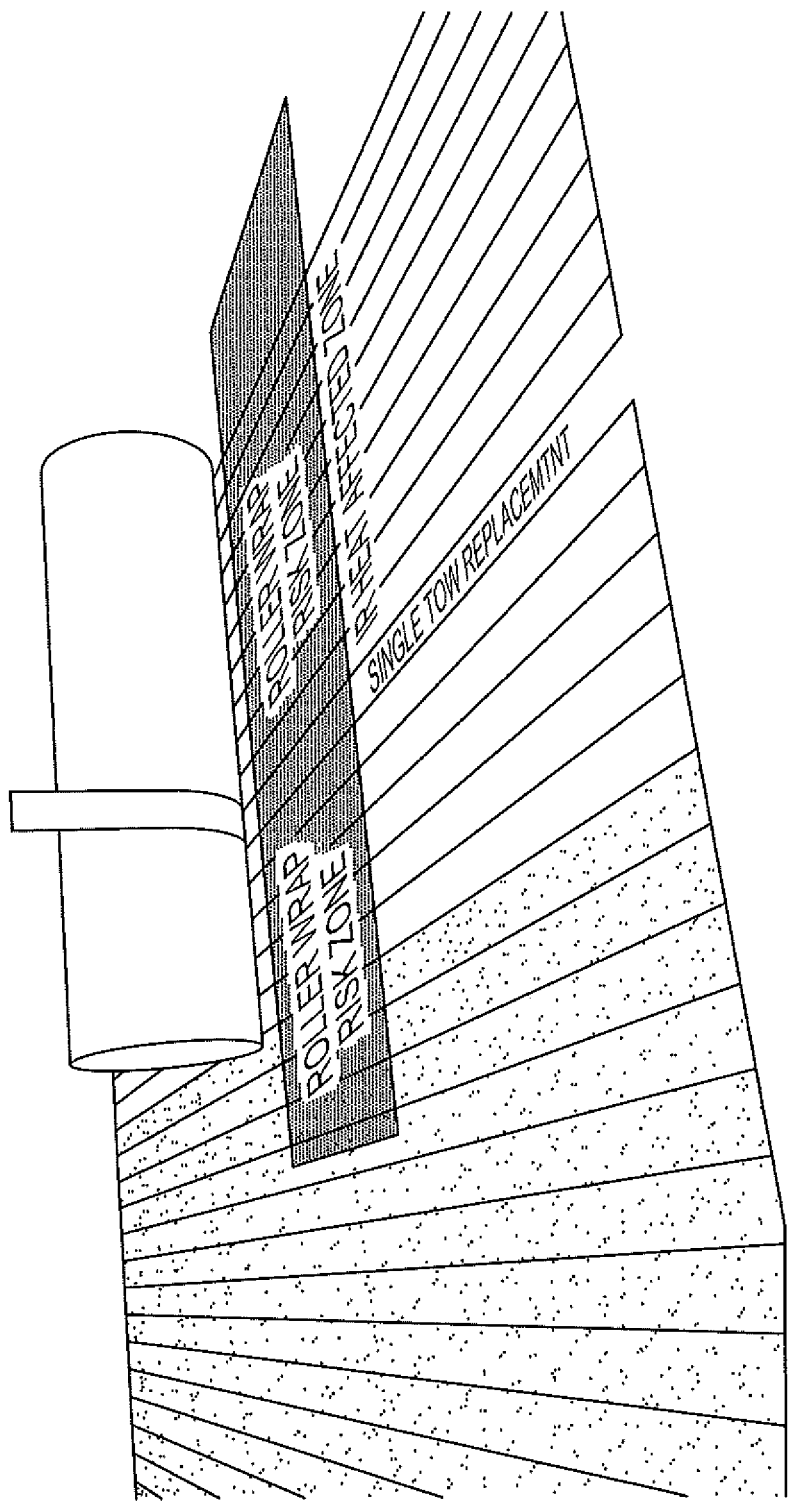
FIG. 4 is a diagram showing a roller wrap risk zone when a single tow is being replaced.

A repair illustrated in FIG. 4, in particular a single tow replacement for a course of sixteen tows. In FIG. 4 the other fifteen tows are heated by the prior art heating system and come in contact with the compaction roller so they represent a risk for roller wrap. The same thing is true if two tows are replaced. Then there are fourteen tows at risk.

For any partial course with the prior art heating system there is risk in all the open lanes that a previously laid down tow gets heated, sticks to and rolls up on the compaction roller. It can be the entire tow that rolls up or just a portion of the tow.

This invention solved this problem because the laser heat source is only heating the associated tow and not the adjacent tows. If two tows are being replaced then only those two laser heat sources are energized and then only while the two tows are feeding. Therefore the risk of roller wrap is eliminated.

For narrow tow where a pair of tows (¼") are heated by one laser heat source module or a tetrad (four) of tows (⅛") heated by one laser heat source module it is best to pull up and repair all tows heated by a given laser. It is easy to pull up and re laydown two or four tows as required and get the benefit that this invention offers to eliminate the risk of roller wrap. Also for partial courses, production planning can either lay all tows for a given laser heat source module or lay no tows for a given laser heat source module to get all the reliability benefits that this invention offers.

Figure 18:
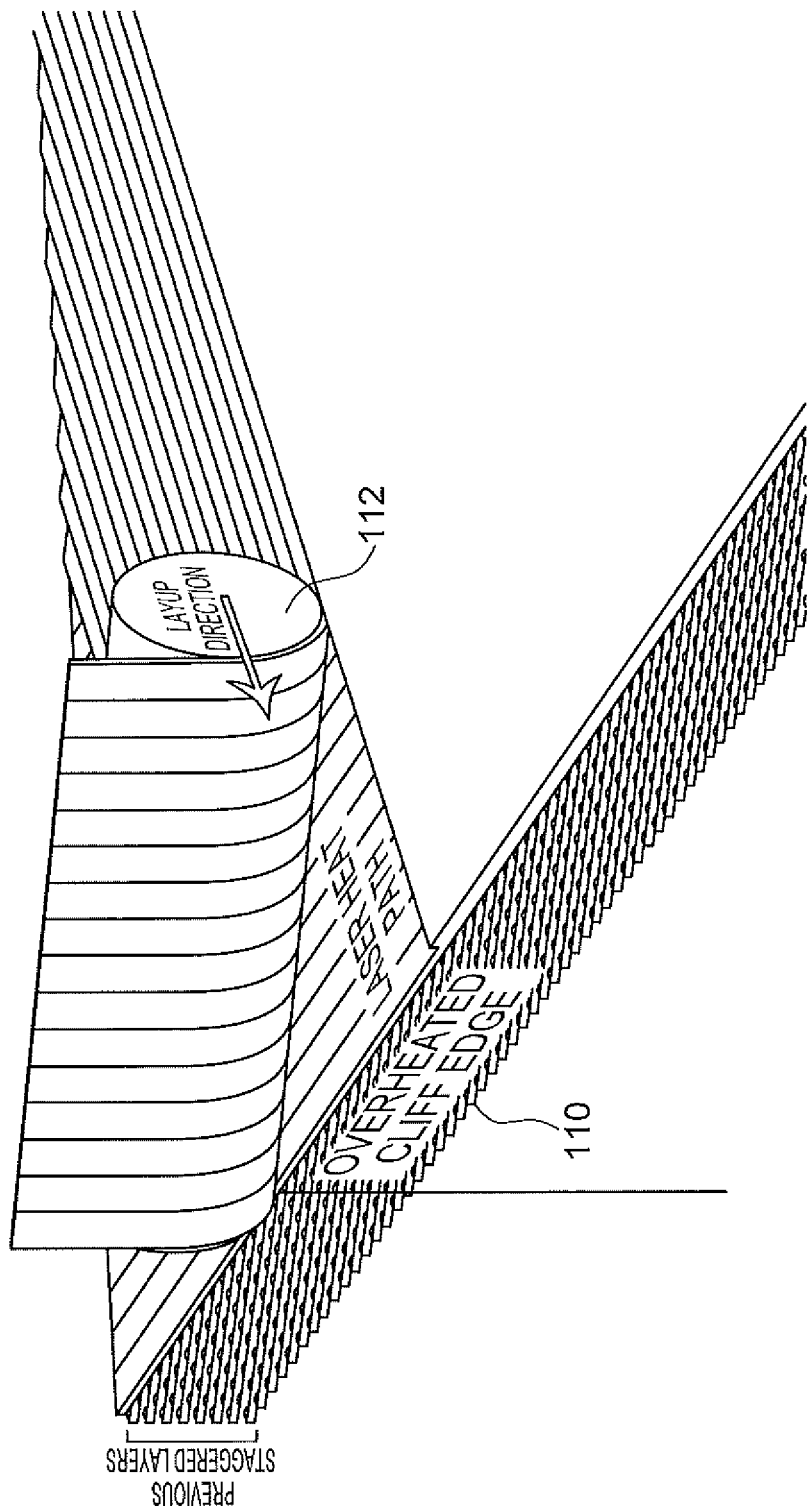
FIG. 18 shows the cliff edge face which results from thick laminate which can be damaged by prolonged exposure to infrared heat.

A problem with a single laser source for the entire course width occurs for thick layups in which the backward pointing laser can "see" the cliff edge 110 of the part after the compaction roller 112 has passed over the edge in a stagger pass. This problem is exacerbated for thermoplastic resin, due to the high heat required for consolidation. This problem is illustrated in FIG. 18. On the stagger pass the backward looking laser can see the face of the cliff edge 110 for an extended period. This extended period of laser heat can cause heat damage or even start the material smoking or catch fire. The present invention resolves this problem. Instead of a full course width laser being left on by necessity the laser heat source module for each lane in the present invention can be switched off the moment its associated tow is dropped. The amount of heat put into the face of the cliff edge is reduced by approximately half.

Thus, with the present invention, it has been demonstrated that laser energy can be controlled so that the laser energy from a laser heat source module is focused on a corresponding tow.

One laser heat source module for each tow provides efficiency in design and implementation based on the number of tows. Each laser heat source module is wired and plumbed separately and can be separately controlled by analog or on/off control. If the number of tows is increased on an AFP machine in the middle of a project from sixteen to twenty then all sixteen modules previously provided can still be used and four more modules are added. The mounting bracket is simply lengthened by four positions. With this invention only one part needs to be stocked for AFP heads which feed anywhere from one to thirty-two tows.

There are many benefits to shutting off the lasers for any lane in which the tow is not fed. The laser is projecting radiant heat at or slightly ahead of the nip point, roughly half the radiant heat above on the compaction roller and half below on the substrate. With the previous technology, full course width fiber coupled laser, the entire width of the course is heated or none is heated. For any lanes for which tow is not fed the radiant energy from the infrared laser would shine on the bare compaction roller which reduces the life of the compaction roller. The solution is to use heat source modular lasers which can be shut off lane by lane, as in the present invention. When the tow in a given lane is no longer fed, the heat source modular laser which heats that lane is switched off so the bare compaction roller is not subject to direct heat from the laser.

For narrow tow where there is a pair of tows (¼") or a tetrad of tows (⅛") heated by one laser heat source module the same benefit will result for not shining laser heat on the compaction roller if all tows for a given laser heat source module are fed and the laser is on, or not fed and the laser is off.

For narrow tow where there is a pair of tows (¼") or a tetrad of tows (⅛") heated by one laser heat source module the same benefit results for the problem of heating of the cliff edge shown in FIG. 18. For a stagger pass where one laser is heating two tows for consolidation the associated laser heat source module will be switched off when the second tow is dropped, yielding almost the entire benefit for solving the cliff edge heating problem.

FIGS. 23-30 show several arrangements of a laser heat source embodiment in which multiple heat sources, i.e. two or more, are associated with individual tows. It is common for the laser heating to extend beyond the width of its associated tow, overlap and negligibly heat neighboring tows, This arrangement is consistent with the present invention. Each individual laser heat source can be implemented as 1) a fiber coupled laser heat source module, or 2) an integrated free space laser heat source module. A common fiber coupled laser heat source module is made by nLight. A common free space laser heat source module is the Model LT-6500 in a T3 package made by Laserline. Either laser heat source module type can be implemented individually or as assembled into a laser module collection or package. In some of the embodiments shown, a laser module collection is used with eight individual laser modules, although the number of laser modules in the laser module collection can be varied. Although laser modules are preferred, other heat sources such as infrared bulbs, pulsed flash lamps, hot gas, inductive heaters and ultrasonic heaters can be used. The laser heat source package is advantageous as it results in lower unit costs with a collection of common laser heat source modules which can be used in various tow arrangements. This is advantageous, since such a laser heat source collection need not be designed for specific tow width applications. Advantages are discussed with respect to each of the various arrangements.

Figure 23:
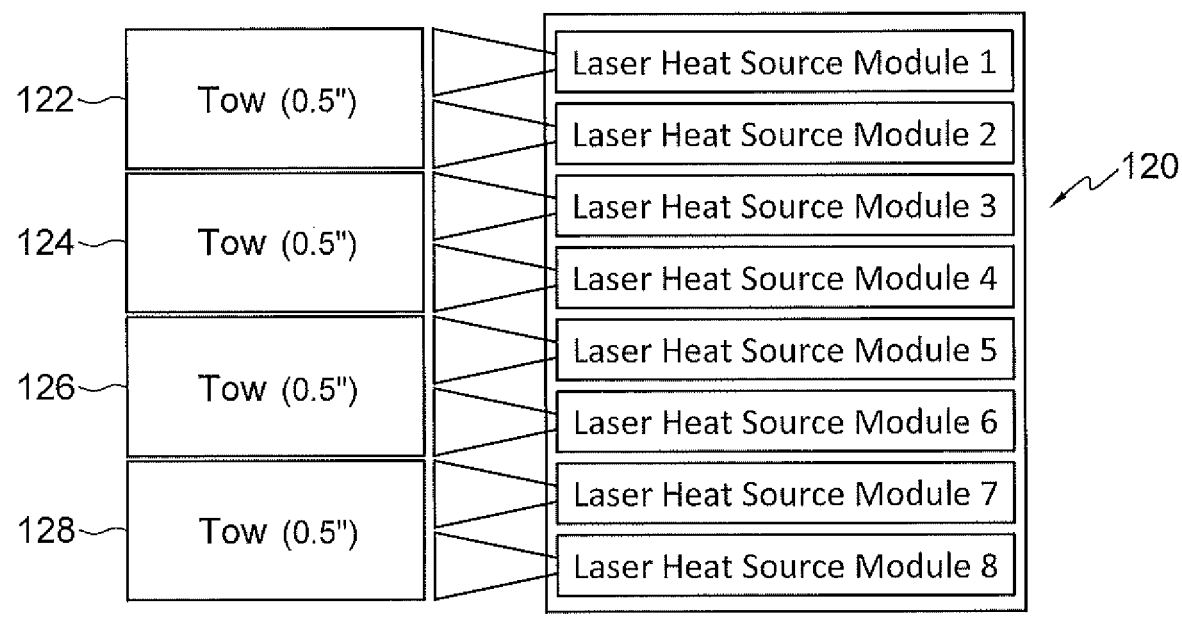
FIG. 23 shows a laser heat source module with eight lasers heating four tows, all 0.5 inches wide.

FIG. 23 shows a first embodiment using multiple laser heat source modules. Each laser heat source module will include a number of individual lasers. The embodiment includes a collection or package of laser heat source modules 120. This collection of laser heat modules 120 includes eight laser heat source modules (1-8). An eight laser module collection as well as a 16 laser module collection are common commercial configurations and result in a lower unit cost by using a single common product for various tow arrangements. In the arrangement of FIG. 23, two laser modules are arranged to heat tow 122, 0.5 inches wide, two laser modules are used to heat a tow 124, also 0.5 inches wide, two laser modules are used to heat a tow 126, 0.5 inches wide and two laser modules are used to heat a tow 128, also 0.5 inches wide. As can be seen, two individual laser heat source modules are actuated in tandem in the arrangement shown for each individual tow. Typically, the laser heat modules will be heating the nip point of each tow, heating the tow and the substrate. They can also be actuated dynamically in any sequence by the system control unit and will be turned on when their associated tow is being applied to the substrate and off when not being applied.

Figure 24:
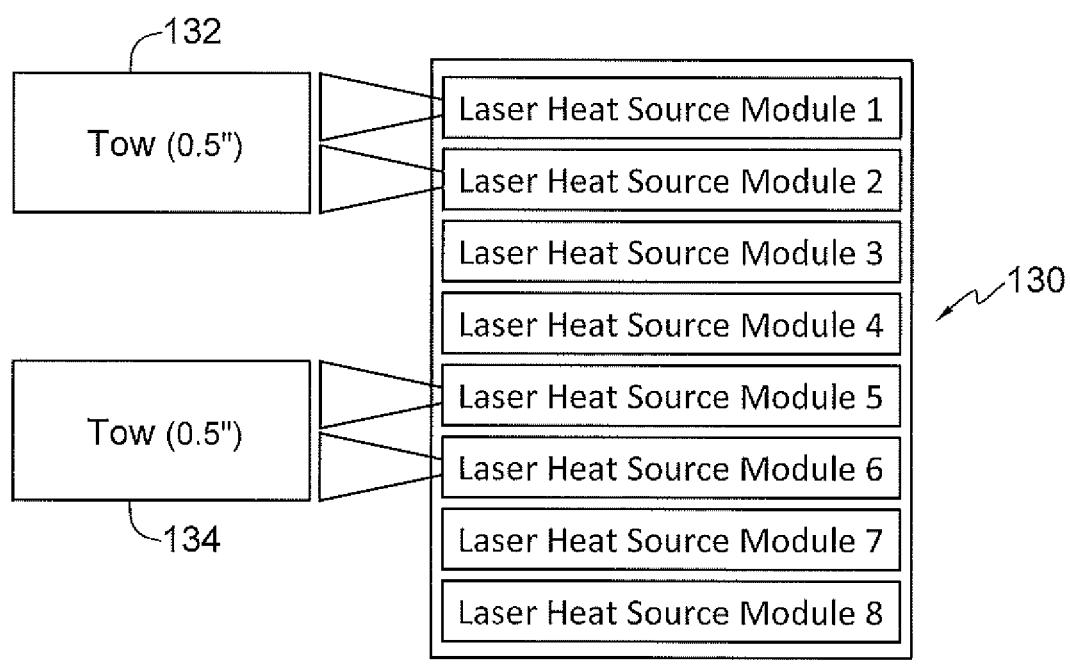
FIG. 24 shows a laser heat source module with eight lasers heating two spaced tows 0.5 inches wide.

FIG. 24 shows a laser heat module collection or package 130 also with eight laser modules. The multiple laser heat modules can be actuated individually or in unison for individual tow widths. In FIG. 24, two laser modules are used to heat an individual tow 132, 0.5 inches wide, while two other laser modules are used to heat a tow 134, 0.5 inches wide, spaced from tow 132. The two laser heat source modules associated with the area between tow 132 and tow 134 are off because there is no tow being applied in that area at this moment. Similarly the heat source modules associated with the area from tow 134 are off since there is no tow being applied in that area at this moment. Typically, the laser modules heat each tow nip point, heating both the tow and the substrate. The laser heat source modules are dynamically actuated; turned on when their associated tows are being applied and off when they are not being applied. In this arrangement, only the laser heat source modules associated with the two tows being applied to the substrate, respectively, are turned on.

Figure 25:
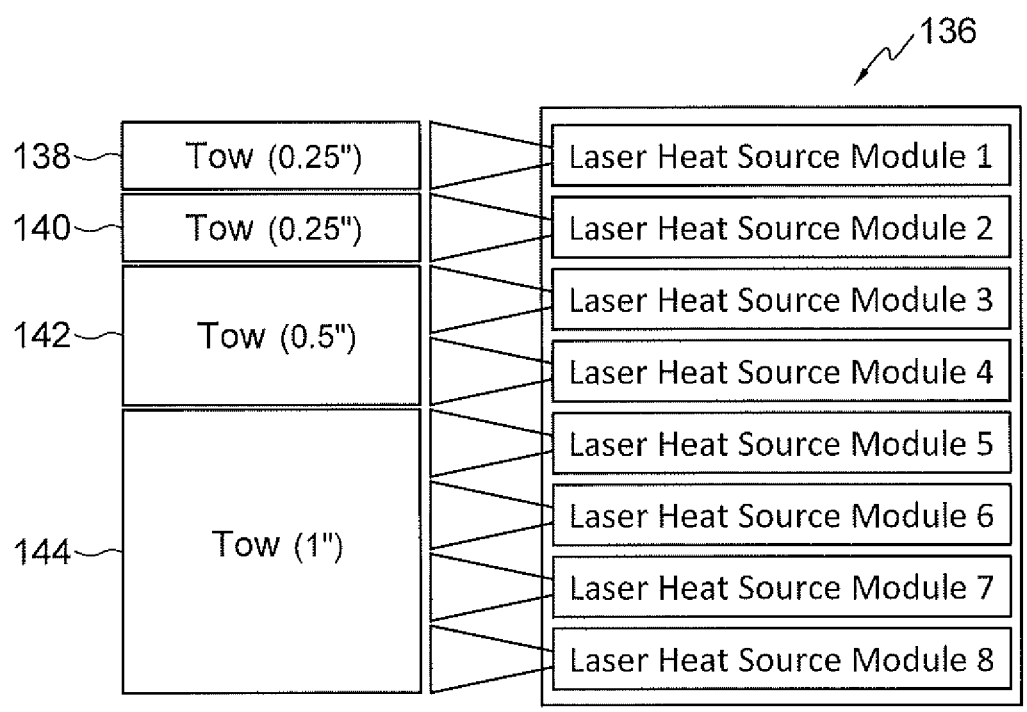
FIG. 25 shows a laser module with eight lasers heating four tows, two 0.25 inches, one 0.5 inch and one 1 inch.

FIG. 25 shows a further arrangement of the embodiment using a laser heat source module collection 136. In this arrangement, a first tow 138 and a second tow 140, both 0.25 inches wide, are heated by single separate laser heat source modules. A third tow 142, 0.5 inches wide, is heated by two laser heat source modules while a fourth tow 144, 1 inch wide is heated by four laser heat source modules. Typically, the laser heat source modules will heat the tows at the nip point, heating the tow and the substrate. A common heat source module collection/package is used even though the widths of tows vary. The common laser heat source collection is advantageous since the laser heat source collection can be produced and purchased at higher volumes, thus reducing unit cost.

Figure 26:
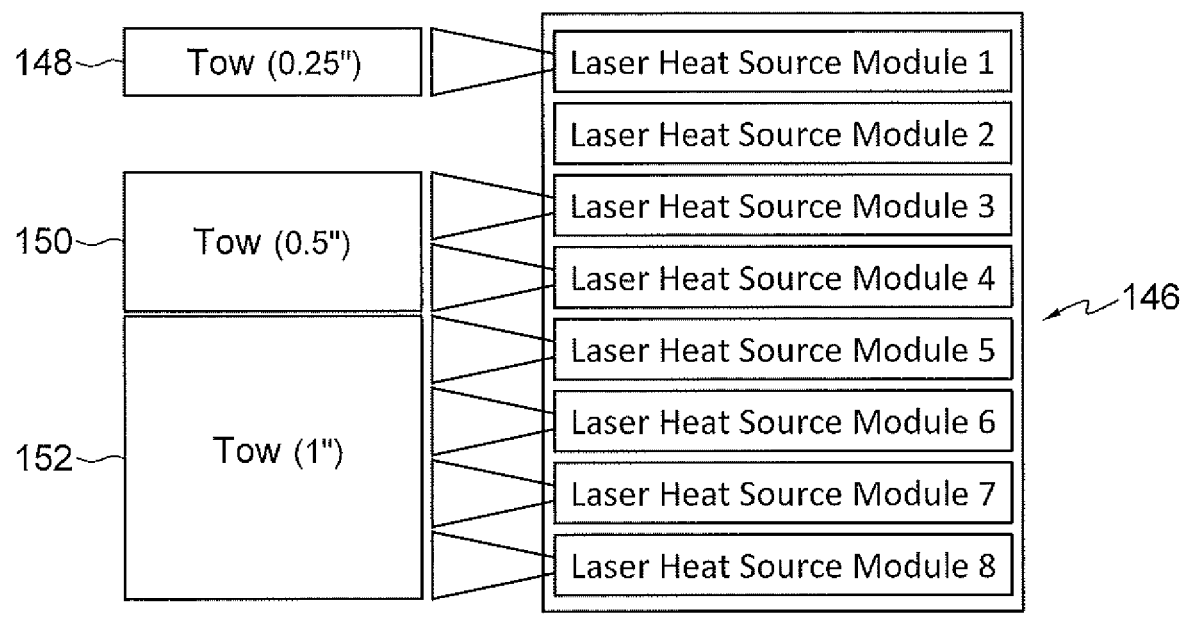
FIG. 26 shows a laser module with eight lasers heating three tows, one 0.25 inch, one 0.5 inch and one 1 inch, spaced from tow 1.

FIG. 26 shows a further arrangement using a laser module collection 146, with a tow 148, 0.25 inches wide, heated by a single laser module, tow 150, 0.5 inches wide, spaced from tow 148, heated by two laser modules, while tow 152, 1 inch wide is heated by four laser modules. The laser heat source module associated with the area between tow 148 and tow 150 is off because there is no tow being applied in that area at this time. In this case, the tows are heated at the nip point, heating both the tow and the substrate. The laser heat source modules are dynamically actuated; turned on only when their associated tows are being applied.

Figure 27:
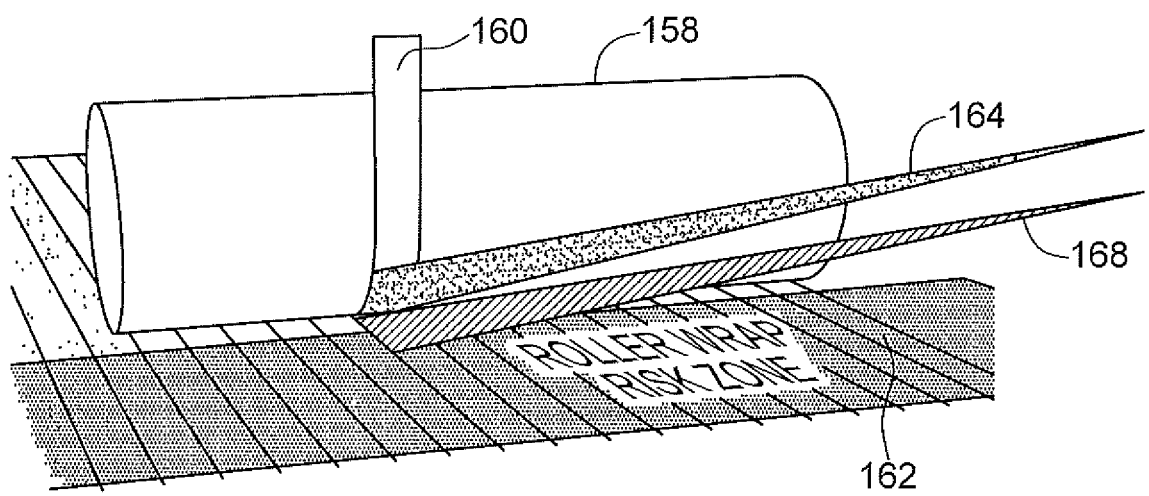
FIG. 27 illustrated first a dedicated laser for the substrate and a second dedicated laser for the tow in one lane as an example.

FIG. 27 is a diagram showing a compaction roller 158, a single tow 160 and a substrate 162. While typically the same heat source module heats the nip point and thus the tow and the substrate, in this example the substrate may require a different heat energy for the tow being applied, to produce effective consolidation. This may be a result of the tow being a different material than the substrate and thus having different heating requirements. It may also be the result of the substrate requiring additional heat due to its proximity to the layup tool, i.e. plies closer to the tool may require more heat than later plies due to higher thermal conductivity to the cold tool which has a large thermal mass. In such a case, a solution is a first laser module 164 directed to the tow, while a second laser module 168 can be directed to its associated substrate 162. This provides a significant amount of flexibility with various tow and substrate thermal requirements. This can also include using laser modules with different wavelengths. One example where two different wavelengths may be used for heating is using an ultraviolet wavelength laser on a glass infused pre-impregnated fiber that is infrared transparent while using an infrared wavelength laser on a standard tow for consolidation.

Figure 28:
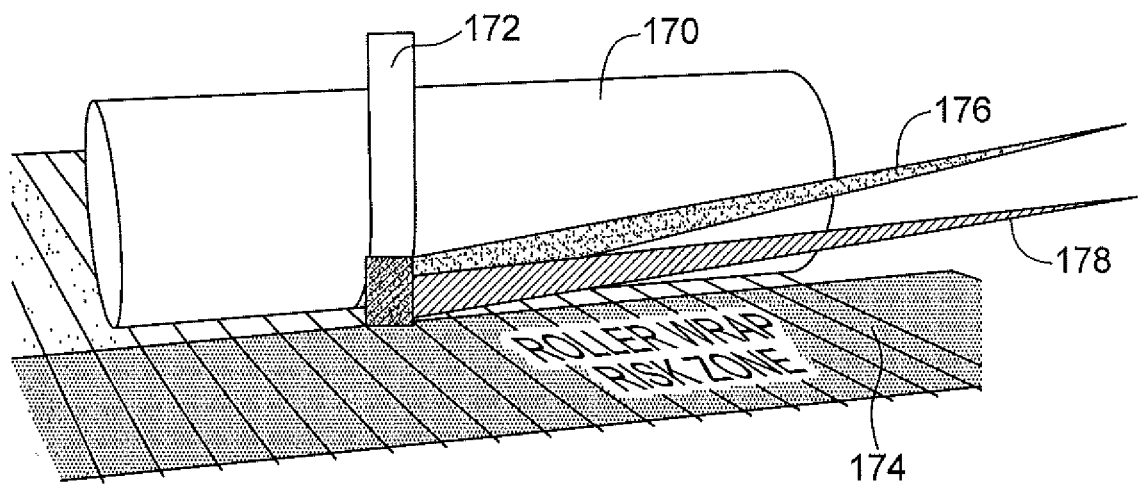
FIG. 28 illustrates two heating sources both heating the nip point of a single tow.

FIG. 28 shows an arrangement which includes a compaction roller 170, a single tow 172 being applied for illustration and a substrate 174 on the tool. Laser modules 176 and 178 used together can for instance produce double the heat to better facilitate consolidation. While this arrangement would typically be directing double the heat at the tow nip point, the two laser modules can alternatively be directed just at the single tow or just at the tow's substrate. The laser modules may also be configured to emit at different wavelengths and different intensities. One example of this is the use of two different wavelength heaters in targeting the resin with an ultraviolet wavelength laser while targeting the fiber with an infrared wavelength laser.

In one or more of the above arrangements of FIGS. 23-28, the heat sources can be controlled such that the intensity of the heat sources or the wavelength of the heat sources can be changed from ply to ply or in response to system information. Furthermore, dynamically, the laser heat sources can be turned on and off independently or in pairs in response to system information.

Figure 29:
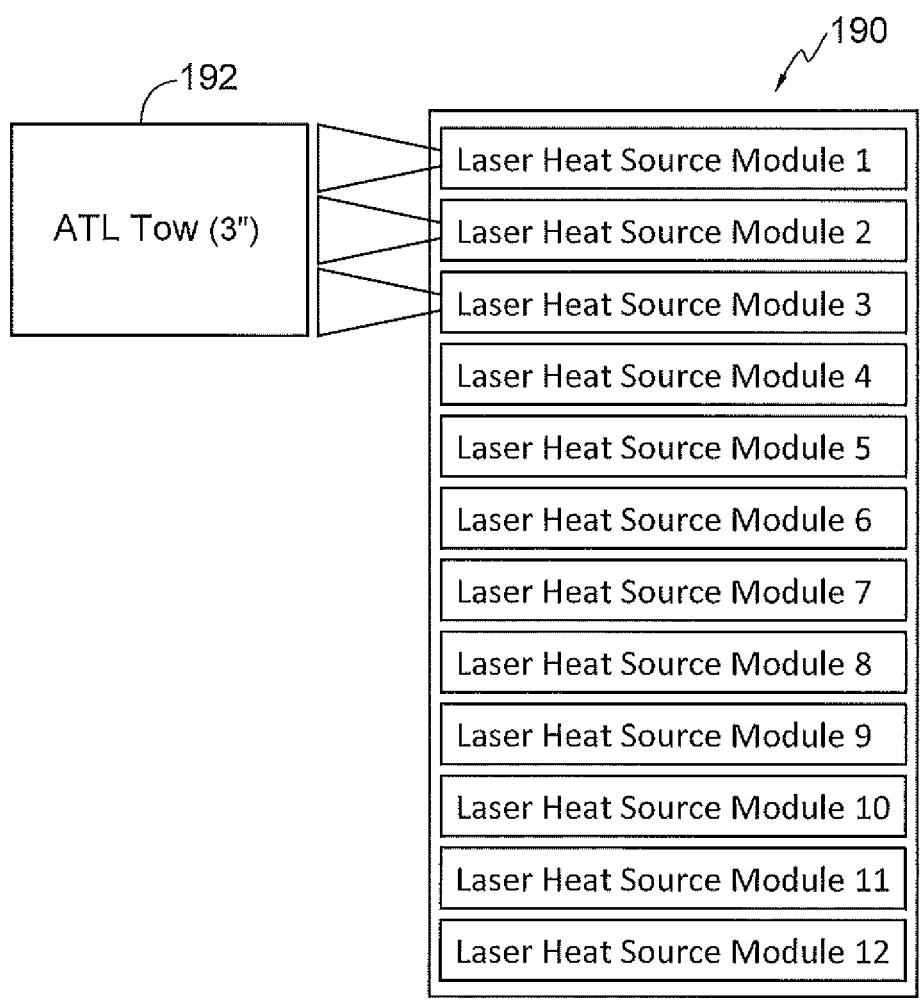
FIG. 29 shows a laser heat module with 12 lasers and an ATL tow of 3 inches.
Figure 30:
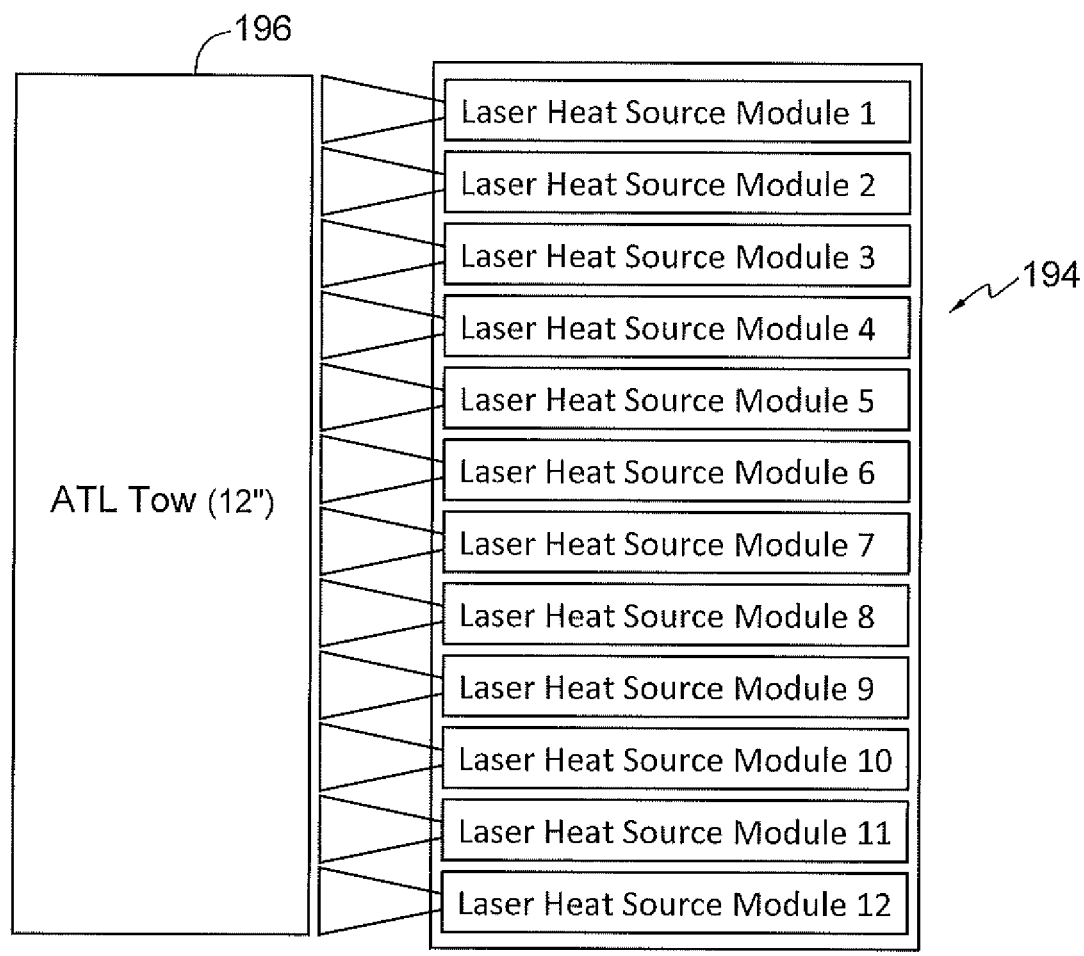
FIG. 30 shows a laser source module with 12 lasers for an ATL wide tow of 12 inches.

FIGS. 29-30 show a different laser heat module collection/package 190 having twelve laser heat source modules which can be used for an ATL (automatic tape laying) machine which can accept a wide range of tow widths. Typically, in a 3 inch to 12 inch range, each tow is a single sheet. Using multiple heat source modules for each tow results in the heat to be applied to correlate with the width of the ATL being processed and ensures that the excess substrate is not being excessively heated, reducing energy demand as well as the risk of roller wrap. Further, it enables the operator to use the same heat source module assembly independent of the tow width being applied in any given operation. FIG. 30 shows an ATL, tow 192, 3 inches wide being heated by a subset of the 12 laser module collection 190. FIG. 30 shows another example of a 12 laser module collection 194, for an ATL tow 196 12 inches wide.

Accordingly, FIGS. 23-30 show various arrangements of multiple, i,e. more than one, heat source modules for single tows. This increases the capability of the invention disclosed in co-pending patent applications Ser. Nos. 16/736,679 and 16/783,895, both of which are currently owned by the owner of the present invention. The present invention uses multiple laser heat sources applied per tow, including the use of different wave length optimized lasers. Wide ATL applications can be covered as well as AFP arrangements. The embodiment provides the ability to have a dedicated laser for heating the substrate for a given tow, separate dedicated laser for heating the same tow itself and multiple lasers heating the same area whether it be the tow, nip point or the substrate.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. An AFP system, comprising:
   an AFP head configured to supply one or more tows under tension, for which the one or more tows are intermittently fed according to a preselected pattern to a compaction roller;
   the compaction roller configured to receive the one or more tows and to press each of the one or more tows with pressure onto the substrate;
   a plurality of heat sources in the form of heat source modules each having an electrical power supply, each heat source module selectably associated with the one or more tows, wherein heat from a set of two or more heat sources of the plurality of heat sources is directed to and heats one intermittently-placed tow of the one or more tows, an area of the substrate corresponding to the one intermittently-placed tow of the one or more tows, or both the one intermittently-placed tow and the area of the substrate corresponding to the one intermittently-placed tow; and
   a control system configured to control the respective supply of heat from the set of heat sources, heat sources of the set being controlled, independently from heat sources not in the set, in accord with the preselected pattern to be powered on during a first period corresponding to when the one intermittently-placed tow is known to be fed from the AFP head and being controlled to be powered off during a second period corresponding to when the one intermittently-placed tow is known not to be fed from the AFP head, wherein the status of being fed or not being fed changes for the one intermittently-placed tow during the application of the one or more tows onto the substrate in accordance with the preselected pattern of tow application.

2. The system of claim 1, wherein the plurality of heat sources includes laser heat sources.

3. The system of claim 2, wherein the laser heat sources are 1) fiber coupled lasers, or 2) free space lasers.

4. The system of claim 2, wherein the laser heat sources are in the form of a collection or package of laser heat source modules.

5. The system of claim 2, wherein one or more of the laser heat sources has a different laser wavelength than another of the laser heat sources.

6. The system of claim 2, wherein the control system is further configured to change a wavelength of laser energy from the laser heat sources from ply to ply or in response to system information.

7. The system of claim 1, wherein the control system controls intensity of the heat produced by the heat sources in the time domain.

8. The system of claim 1, wherein the heat sources are activated on and off dynamically in response to system information.

9. The system of claim 1, wherein the set of multiple-heat sources are applied cooperatively to increase heat on a common element.

10. The system of claim 1, wherein the heat sources are controlled such that the intensity of heat from the heat sources is changed from ply to ply or in response to system information.

11. The system of claim 1, wherein the set of heat sources is arranged such that heat projected from the set of heat sources collectively is slightly wider than a width of the intermittently-placed tow and negligibly heats a neighboring tow or tows and/or their corresponding substrate.

12. The system of claim 1, wherein the control system is further configured to turn to heat sources of the set on and off together in accord with the preselected pattern.

13. The system of claim 1, wherein the control system is further configured to cause the heat sources of the set to feed infrared energy into a respective fiber optic cables for each heat source, each fiber optic cable having a termination which directs radiant heat onto the one intermittently-placed tow at or in front of a nip point thereof.

14. The system of claim 1, wherein the heat from the set of two or more heat sources of the multiple plurality of heat sources is directed to and heats both the intermittently-placed tow and the area of the substrate corresponding to the one intermittently-placed tow, at least one heat source of the set directed to the intermittently-placed tow and at least one heat source of the set directed to the corresponding substrate.

* * * * *